United States Patent
Singh et al.

(10) Patent No.: US 9,223,617 B2
(45) Date of Patent: Dec. 29, 2015

(54) METHODS AND SYSTEMS FOR MIGRATING NETWORKED SYSTEMS ACROSS ADMINISTRATIVE DOMAINS

(75) Inventors: Atul Singh, Princeton, NJ (US); Guofei Jiang, Princeton, NJ (US); Akhilesh Saxena, Morristown, NJ (US)

(73) Assignee: NEC Laboratories America, Inc., Princeton, NJ (US)

( * ) Notice: Subject to any disclaimer, the term of this patent is extended or adjusted under 35 U.S.C. 154(b) by 730 days.

(21) Appl. No.: 13/102,753

(22) Filed: May 6, 2011

(65) Prior Publication Data

US 2011/0276675 A1 Nov. 10, 2011

Related U.S. Application Data

(60) Provisional application No. 61/331,940, filed on May 6, 2010, provisional application No. 61/479,898, filed on Apr. 28, 2011.

(51) Int. Cl.
| | |
|---|---|
| *G06F 15/173* | (2006.01) |
| *G06F 9/44* | (2006.01) |
| *H04L 9/32* | (2006.01) |
| *G06F 15/16* | (2006.01) |
| *G06F 9/48* | (2006.01) |

(52) U.S. Cl.
CPC .................... *G06F 9/4856* (2013.01)

(58) Field of Classification Search
CPC . G06F 3/0647; G06F 9/4856; G06F 11/1466; G06F 11/1458; G06F 11/203; G06F 9/44505
USPC ........................................................ 709/223
See application file for complete search history.

(56) References Cited

U.S. PATENT DOCUMENTS

| | | | | |
|---|---|---|---|---|
| 7,484,206 | B2 * | 1/2009 | Drouet et al. | 717/169 |
| 2006/0112096 | A1 * | 5/2006 | Ahluwalia et al. | 707/6 |
| 2007/0079126 | A1 * | 4/2007 | Hsu et al. | 713/176 |
| 2007/0239993 | A1 * | 10/2007 | Sokolsky et al. | 713/188 |
| 2009/0150451 | A1 * | 6/2009 | Gejdos et al. | 707/200 |

(Continued)

OTHER PUBLICATIONS

Aggrawal, B., et al. "Netprints: Diagnosing Home Network Misconfigurations Using Shared Knowledge" Proceedings of the 6th USENIX Symposium on Networked Systems Design and Implementation, NSDI 2009. USENIX Association 2009. Apr. 2009. (16 Pages).

(Continued)

*Primary Examiner* — Phuoc Nguyen
*Assistant Examiner* — Kishin G Belani
(74) *Attorney, Agent, or Firm* — Joseph Kolodka

(57) ABSTRACT

Systems and methods for determining whether networked system migrations are successful are disclosed. In accordance with one method, a first set of properties of the networked system on a source platform in a first administrative domain is determined. Further, the method includes transferring the networked system to a destination platform in a second administrative domain. In addition, a second set of properties of the transferred system on the destination platform is determined, where the first and second sets of properties include functional properties and at least one of: performance properties, security properties or reliability properties. The method also includes outputting an indication that the transfer of the system to the destination platform is successful in response to determining that one or more of the properties of the second set are equivalent to corresponding properties of the first set.

15 Claims, 7 Drawing Sheets

(56) References Cited

U.S. PATENT DOCUMENTS

2010/0191505 A1\* 7/2010 Chen et al. .................... 702/182
2011/0219372 A1\* 9/2011 Agrawal et al. .................. 718/1

OTHER PUBLICATIONS

Amazon Web Services. "Amazon Elastic Compute Cloud" Retrievable at: http://aws.amazon.com/ec2/. Retrieved on: May 6, 2011. (10 Pages).
Amazon Web Services. "Amazon EC2 Faq" Retrievable at: http://aws.amazon.com/ec2/faqs/ #What_happens_to_my_data_when_a_system_terminates. Retrieved on: May 6, 2011. (18 Pages).
Amazon Web Services. "Amazon Simpledb" Retrievable at: http://aws.amazon.com/simpledb/. Retrieved on: May 6, 2011. (7 Pages).
Amazon Web Services. "AWS Cloudformation" Retrievable at: http://aws.amazon.com/cloudformation/. Retrieved on: May 6, 2011. (5 Pages).
Arpaci-Dusseau, A., et al. "Information and Control in Gray-Box Systems" Proceedings of the 18th ACM Symposium on Operating System Principles. Oct. 2001. (14 Pages).
Attariyan, M., et al. "Automating Configuration Troubleshooting with Dynamic Information Flow Analysis" Proceedings of the 9th USENIX Symposium on Operating Systems Design and Implementation (OSDI). Oct. 2010. pp. 1-14.
Bagchi, S., et al. "Dependency Analysis in Distributed Systems Using Fault Injection: Application to Problem Determination in an E-Commerce Environment" 12th International Workshop on Distributed Systems: Operations and Management (DSOM). Oct. 2001. (14 Pages).
Barham, P., et al. "Using Magpie for Request Extraction and Workload Modelling" OSDI '04: 6th Symposium on Operating Systems Design and Implementation. Dec. 2004. pp. 259-272.
Bhagwat, P., et al. "Network Layer Mobility: An Architecture and Survey" IEEE Personal Communications. vol. 3, No. 3. Jun. 1996. pp. 54-64.
Bitblaze. "Bitblaze: Binary Analysis for Computer Security" Retrievable at: http://bitblaze.cs.berkeley.edu/. Retrieved on: May 6, 2011. (6 Pages).
Champin, P., et al. "Measuring the Similarity of Labeled Graphs" ICCBR 2003, LNAI 2689, 2003. pp. 80-95.
Chandy, K., et al. "Distributed Snapshots: Determining Global States of Distributed Systems" ACM Transactions on Computer Systems, vol. 3, No. 1. Feb. 1985. pp. 63-75.
Chen, M., et al. "Pinpoint: Problem Determination in Large, Dynamic Internet Services" International Conference on Dependable Systems and Networks (DSN 2002), IEEE Computer Society 2002. Jun. 2002. (10 Pages).
Clark, C., et al. "Live Migration of Virtual Machines" 2nd Symposium on Networked Systems Design and Implementation (NSDI 2005). May 2007. (14 Pages).
Cloudswitch. Retrievable at: http://www.cloudswitch.com/. Retrieved on: May 6, 2011. (1 Page).
Commvault. "Backup Sets—File System, Netware Server, Active Directory, and Microsoft Data Protection Manager Idataagents—How to" Retrievable at: http://documentation.commvault.com/hds/release_8_0_0/books_online_1/english_us/features/backupset/file_system_how_to. htm#preserve_file_access_time. Retrieved on: May 6, 2011. (7 Pages).
Crameri, O., et al. "Staged Deployment in Mirage, An Integrated Software Upgrade Testing and Distribution System" Proceedings of the 21st ACM Symposium on Operating Systems Principles. Oct. 2007. (16 Pages).
Dignan, L. "Migrating to Amazon Web Services: The Blueprint" Dec. 2008. Retrievable at: http:// www.zdnet.com/blog/btl/migrating-to-amazon-web-services-the-blueprint/11275. Retrieved on: May 6, 2011. (5 Pages).
Ding, X., et al. "Splitter: A Proxy-Based Approach for Post-Migration Testing of Web Applications" Proceedings of the 5th European Conference on Computer systems, EuroSys. Apr. 2010. (14 Pages).
Emulab. "Network Emulation Testbed Home" Retrievable at: http://www.emulab.net. Retrieved on: May 6, 2011. (1 Page).
Gartner. "Gartner Highlights Key Productions for it Organizations and Users in 2010 and Beyond" Retrievable at: http://www.gartner.com/it/page.jsp?id=1278413. Retrieved on: May 6, 2011. (4 Pages).
Hajjat, M., et al. "Cloudward Bound: Planning for Beneficial Migration of Enterprise Applications to the Cloud" Proceedings of the ACM SIGCOMM 2010 Conference on Applications, Technologies, Architectures, and Protocols for Computer Communications. Aug.-Sep. 2010. (12 Pages).
Hyperstratus. "Migrating Applications to the Cloud" Retrievable at: http://www.hyperstratus.com/docs/HyperStratus_Whitepaper_AWS_Case_Study_Lessonopoly.pdf. Retrieved on: May 6, 2011. (24 Pages).
IBM. "The Support Authority: Get to Know the Visual Confirguration Explorer" Retrievable at: http://www.ibm.com/developerworks/websphere/techjournal/0710_supauth/0710_supauth.html. Retrieved on: May 6, 2011. (11 Pages).
IBM. "Websphere Software" Retrievable at: http://www-01.ibm.com/software/websphere/. Retrieved on: May 6, 2011. (3 Pages).
Jul, E., et al. "Fine-Grained Mobility in the Emerald System" ACM Transactions on Computer Systems, vol. 6, No. 1. Feb. 1988. pp. 109-133.
Maltz, D., et al. "MSOCKS: An Architecture for Transport Layer Mobility" Proceedings IEEE INFOCOM '98, The Conference on Computer Communications, Seventeenth Annual Joint Conference of the IEEE Computer and Communications Societies, Gateway to the 21st Century. Mar.-Apr. 1998. pp. 1037-1045.
McAfee. "Corporate Knowledgebase" Retrievable at: https://kc.mcafee.com/corporate/index? page=content&id=KB69821&cat=Corp_Virusscan_Command_Line_Scanner&actp=List. Retrieved on: May 6, 2011. (1 Page).
Mediawiki. "Mediawiki.org" Retrievable at: www.mediawiki.org. Retrieved on: May 6, 2011. (1 Page).
Messmer, T. "Efficient Graph Matching Algorithms for Preprocessed Model Graphs" PhD Thesis Paper. Nov. 1995. (168 Pages).
Microsoft. "Process Monitor" Retrievable at: http://technet.microsoft.com/en-us/sysinternals/bb896645. Retrieved on: May 6, 2011. (2 Pages).
Microsoft. "The Windows Registry" Retrievable at: http://technet.microsoft.com/en-us/library/cc751049.aspx. Retrieved on: May 6, 2011. (7 Pages).
Mysql. "15.1.1.3. Creating a User for Replication" Retrievable at: http://dev.mysql.com/doc/refman/5.6/en/replication-howto-repuser.html. Retrieved on: May 6, 2011. (2 Pages).
Nagaraja, K., et al. "Understanding and Dealing with Operator Mistakes in Internet Services" 6th Symposium on Operating System Design and Implementation (OSDI 2004). Dec. 2004. pp. 61-76.
Novell. "Platespin Migrate" Retrievable at: http://www.novell.com/products/migrate/. Retrieved on: May 6, 2011. (2 Pages).
Osman, S., et al. "The Design and Implementation of ZAP: A System for Migrating Computing Environments" Proceedings of the 5th Symposium on Operating Systems Design and Implementation (OSDI 2002). Dec. 2002. pp. 1-16.
Planetlab. Retrievable at: http://www.planet-lab.org/. Retrieved on: May 6, 2011. (1 Page).
Powell, M., et al. "Process Migration in Demos/MP" Proceedings of the Ninth ACM Symposium on Operating System Principles. Oct. 1983. (10 Pages).
Qu, X., et al. "A Mobile TCP Socket" International Conference on Software Engineering, 1997. pp. 1-6.
Ramachandran, V., et al. "Determining Configuration Parameter Dependencies via Analysis of Configuration Data From Multi-Tiered Enterprise Applications" Proceedings of the 6th International Conference on Autonomic Computing, ICAC 2009. Jun. 2009. pp. 169-178.
Rubis. "Rice University Bidding System" Retrievable at: http://rubis.ow2.org/. Retrieved on: May 6, 2011. (2 Pages).
Snoeren, A., et al. "An End-To-End Approach to Host Mobility" MOBICOM 2000, Proceedings of the sixth annual international con-

(56) References Cited

OTHER PUBLICATIONS ference on Mobile computing and networking. Aug. 2000. (12 Pages).

Tak, B., et al. "VPATH: Precise Discovery of Request Processing Paths From Black-Box Observations of Thread and Network Activities" The 2009 USENIX Annual Technical Conference. Jun. 2009. pp. 1-14.

Theimer, M., et al. "Preemptable Remote Execution Facilities for the V-System" Proceedings of the Tenth ACM Symposium on Operating System Principles. Dec. 1985. pp. 2-12.

Travostino, F., et al. "Seamless Live Migration of Virtual Machines Over the MAN/WAN" Future Generation Computer Systems 2006. Volume 22, No. 1-2. Oct. 2006. pp. 1-10.

Vmware. "Vmotion for Live Migration of Virtual Machines" Retrievable at: http://www.vmware.com/products/vmotion/. Retrieved on: May 6, 2011. (2 Pages).

Yabandeh, M., et al. "Almost-Invariants: From Bugs in Distributed Systems to Invariants" EPFL Technical Report. Oct. 2009. pp. 1-16.

Zookeeper. "Apache Zookeeper" Retrievable at: http://hadoop.apache.org/zookeeper/. Retrieved on: May 6, 2011. (2 Pages).

\* cited by examiner

METHODS AND SYSTEMS FOR MIGRATING NETWORKED SYSTEMS ACROSS ADMINISTRATIVE DOMAINS

RELATED APPLICATION INFORMATION

This application claims priority to provisional application Ser. No. 61/331,940 filed on May 6, 2010 and to provisional application Ser. No. 61/479,898 filed on Apr. 28, 2011, each of which is incorporated herein by reference.

This application is related to commonly owned application Ser. No. 13/102,807, entitled 'METHODS AND SYSTEMS FOR DISCOVERING CONFIGURATION DATA'), which is filed concurrently herewith and is incorporated herein by reference.

BACKGROUND

1. Technical Field

The present invention relates to migration of networked systems and, more particularly, to validating properties of migrated systems.

2. Description of the Related Art

A Cloud infrastructure enables end users to rent computing resources for running their own services. A key benefit of such an infrastructure is reduced capital expenditure, increased flexibility, and reduced management and energy costs for the customers. Given these non-trivial potential benefits, many enterprise customers are considering migrating their services to the Cloud. Even though single host virtual machine (VM) migration has been studied and commercial offerings exist, there are still numerous challenges in ensuring a correct migration, especially when migration is performed across administrative domains. One important aspect of VM migration is the discovery of configuration data in the original system, as this data should be consistently updated after migration.

SUMMARY

One embodiment is directed to a method for determining whether a networked system migration is successful. In accordance with the method, a first set of properties of the networked system on a source platform in a first administrative domain is determined. Further, the method includes transferring the networked system to a destination platform in a second administrative domain such that at least a portion of the networked system is transferred to at least one storage medium on the destination platform. In addition, a second set of properties of the transferred system on the destination platform is determined, where the first and second sets of properties include functional properties and at least one of: performance properties, security properties or reliability properties. The method also includes outputting an indication that the transfer of the system to the destination platform is successful in response to determining that the functional properties of the second set are equivalent to the functional properties of the first set and that at least one of the performance properties, the security properties or the reliability properties of the second set are equivalent to at least one of the corresponding performance properties, the security properties or the reliability properties of the first set of properties.

An alternative embodiment is directed to a migration system for determining whether a networked system migration is successful. The system includes a first learning module, a transfer module, a second learning module and a comparator. The first learning module is configured to determine a first set of properties of the networked system on a source platform in a first administrative domain. In addition, the transfer module is configured to transfer the networked system to a destination platform in a second administrative domain such that at least a portion of the networked system is transferred to at least one storage medium on the destination platform. Further, the second learning module is configured to determine a second set of properties of the transferred system on the destination platform, wherein the first and second sets of properties include functional properties and at least one of: performance properties, security properties or reliability properties. In turn, the comparator is configured to output an indication that the transfer of the networked system to the destination platform is successful in response to determining that the functional properties of the second set are equivalent to the functional properties of the first set and that at least one of the performance properties, the security properties or the reliability properties of the second set are equivalent to at least one of the corresponding performance properties, the security properties or the reliability properties of the first set of properties.

Another embodiment is directed to a method for validating network level properties of a migrated system. The method includes transmitting a request to a first networked system on a source platform in a first administrative domain and to a second networked system on a destination platform in a second administrative domain, where the second networked system is generated by migrating the first networked system to the destination platform. The method further includes monitoring network packets that are exchanged between components in the first networked system to determine a first network trace and between components in the second networked system to determine a second network trace. In addition, the method includes generating a first network property graph based on the first network trace and a second network property graph based on the second network trace. Moreover, the method includes determining, by a processor, that a network property of the second networked system is equivalent to a network property of the first networked system in response to determining that a metric that is based on edges of the second network property graph is within a pre-determined error threshold of a metric that is based on edges of the first network property graph.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
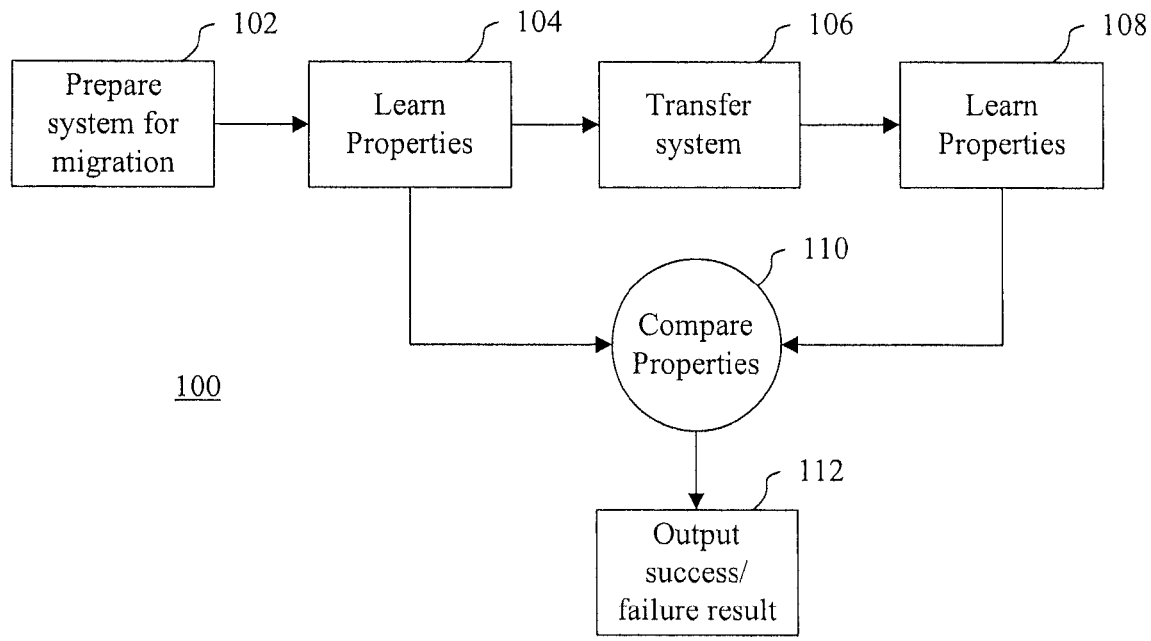
FIG. 1 is a block/flow diagram of an embodiment of a method/system for migrating a system between platforms.

Migration of networked systems, such as multi-tier enterprise systems, across administrative domains can fail due to a variety of reasons, ranging from simple-to-diagnose errors, such as hardware faults, to complex software errors, such as configuration errors, errors in file and access permissions, errors in user credentials and authentication failures, database inconsistency and performance issues. Migrating networked applications to the Cloud presents an even greater challenge due to the scale, complex internal logic, and the many interdependencies between different components of such services. Currently, there is a lack of a tool that simplifies the migration process of a networked distributed system comprehensively. Existing approaches are manual, error prone, and time consuming.

Exemplary embodiments of the present invention are directed to novel tools for simplifying and automating offline migration of a networked service across administrative domains. At a high level, an embodiment learns the fundamental properties and behavior of the system in an existing deployment. Further, the embodiment transfers the system to the new environment and performs tests to determine whether fundamental properties of the system remain consistent in the destination platform. If not, then the embodiment reports the error. The high level intuition behind this embodiment is that a distributed system can be accurately described based on a few fundamental properties. In particular, an important hypothesis on which the embodiment is based is that a networked service can be accurately characteristized by a variety of black-box properties—ranging from functional properties, which are basic, to complex properties. In particular, four types of properties can be considered: (i) basic functional (ii) performance, (iii) reliability, and (iv) security. Accordingly, the embodiment does not require intimate knowledge of system's internal logic and is therefore widely applicable. By learning these properties in the existing deployment and testing for these properties in the migrated environment, the embodiment can accurately predict how a distributed system will perform after migration. Moreover, in the case of a failed migration, the embodiment can facilitate debugging by identifying and pinpointing the failed properties. By monitoring such a wide range of properties, the embodiment can achieve high coverage of important characteristics of the distributed system and therefore can achieve high accuracy in its prediction.

In accordance with exemplary aspects, the present methods/systems can be extensible and such that their knowledge bases grow organically as they are used to migrate different kinds of services to a wide range of Clouds. For example, embodiments can maintain an internal database of the different kind of properties that work across different services and the tests to evaluate such properties. Moreover, embodiments can also store information about each Cloud for which they are used to migrate systems and can re-use this information for subsequent migration tasks. Further, embodiments can be employed to implement offline migration of both virtualized and non-virtualized enterprise applications to Cloud environments.

It should be understood that embodiments described herein may be entirely hardware, entirely software or including both hardware and software elements. In a preferred embodiment, the present invention is implemented in hardware and software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid state memory, magnetic tape, a removable computer diskette, a random access memory (RAM), a read-only memory (ROM), a rigid magnetic disk and an optical disk, etc.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a high-level block/flow diagram of an embodiment 100 of a system/method 100 for migrating a system from one platform to another is illustrated. Preliminarily, an overview of the present system/method 100 is provided for ease of understanding. It should be understood that each of the blocks in the embodiment 100 can be implemented by a hardware processor (not shown) that is configured to retrieve and execute software instructions stored on a storage medium (not shown) to implement the functions of the blocks described herein below. Alternatively, each of the blocks can be implemented by an independent, respective hardware processor that employs one or more storage mediums from which it retrieves software instructions for execution to implement the functions of the respective blocks described herein below.

The input provided to the present system/method can be a description of an existing deployment of a distributed system and a target platform where the system is to be migrated. The present system/method 100 can first learn various properties or characteristics of the system in the existing deployment. In addition, the system/method can perform a system transfer to the target platform and can perform testing in the migrated deployment to estimate the success of migration. The system/method 100 can be implemented internally in four stages: preparation, learning, transfer, learning and comparison.

For example, at block 102, the present system/method prepares the existing deployment so that it can detect different kinds of properties. One function of block 102 is to ensure that the application state is consistent in that all ongoing operations are committed and their effects are reflected in the state. In one embodiment, a graceful shutdown of the service is performed. To have a minimum impact on the service availability, the shutdown can be performed during periods in which the load on the distributed system is low, such as over the weekend or at night. Thus, the present system/method can be implemented as an offline migration tool. Note that many e-commerce services routinely go offline for routine maintenance tasks, such as upgrades.

At block 104, the present system/method can detect different types of properties or characteristics of the system. For example, consider a three-tier web application. The configuration information stored in "/etc/httpd/conf/workers.properties" at the Apache web server includes the location of the application server, which is considered here as a basic functional property of the three-tier system. Other kinds of properties that are detectable at block 104 include performance, security and reliability properties, as discussed in more detail herein below. In accordance with one embodiment, block 104 can focus only on black-box properties, i.e., the properties that are externally visible. The focus on black-box properties enables the present system/method to be widely applicable and generic.

At block 106, the present system/method can transfer the distributed system, including the application logic as well as the data, to the destination location. For example, the transfer could include transferring at least a portion of the system from one or more storage mediums on the source platform to one or more storage mediums on the destination platform. Even though conceptually simple, this step is laborious, error prone, and highly dependent on the destination Cloud platform. For example, the target platform may not permit customers to upload machine images that are larger than a certain limit. Moreover, deployment in the cloud involves updating the application configuration data correctly, using appropriate access control policies and virtual machine placement for good performance. By simplifying and mostly automating this process and accommodating these types of constraints imposed by the cloud platform, the present system/method considerably reduces the chances of error and enables customers to focus on logical and other application-dependent problems. For example, at block 106, the networked system at the source platform can be automatically modified such that the migrated system complies with constraints imposed by the destination platform.

At block 108, the present system/method can evaluate property tests in the new deployment environment. For example, at block 108, the properties obtained at block 104 can be determined for the system in the new platform to which it was migrated. Further, at block 110, the present system/method can compare the determined properties with the properties at the source of the deployment. One important feature of the present system/method 100 is to identify the appropriate comparator function for each property. For example, some properties should match identically, e.g., the IP (internet protocol) address of the application tier stored in the webserver should match the actual IP address of the application tier server. However, not all property values may match exactly at the source and destination deployment. For example, the peak performance obtained may differ to some degree. Specific comparator functions and their applications are described in more detail herein below.

Having described a general overview of the embodiment 100, more specific exemplary aspects of the present system and method are now provided. Returning to the learning block 104, as noted above, an important feature of the present system/method 100 is the detection of key properties of a given distributed system. Further, such properties can be used during the learning 108 and comparing 110 blocks to estimate if the migrated system is behaving as expected. Informally, a property represents a fundamental characteristic of the system. For example, the configuration files read by a service at startup and the network traffic generated to complete a request are two such properties. Given the wide range of characteristics of distributed systems, the present system/method 100 identifies a wide range of properties to ensure an ample coverage of its tests and to achieve high accuracy in its prediction on the success of a migration.

As indicated above, the system/method 100 can be configured to be widely applicable. In particular, the learning block 104 and the learning block 108 can focus on externally observable properties, i.e. the properties that do not require examination of the state of application at each participating node or examining the contents of the messages exchanged between different nodes. For example, the size of messages and the source and destination IP addresses are examples of such externally visible properties. It is noted that this aspect makes the embodiment 100 a black-box approach and hence applicable to a large class of distributed systems. It is important here to contrast the term property as employed in the embodiment 100 from other uses of the term in the literature. For example, earlier proposals interpret a property as a relation between the application state present at different nodes of a distributed system. In contrast, the embodiment 100 completely neglects the state maintained by the application and focuses only on generic and externally visible behavior of the system.

With regard to property classification, for the sake of simple exposition, it can be assumed that the properties described below are provided by an Oracle. However, this assumption can be relaxed, as discussed in more detail herein below. Properties can be classified in the following categories: functional, performance, security and reliability.

Functional properties characterize basic behavior of the system to be migrated. For example, accessing the index.html page of a web server returns the expected page and should not generate an error. There are many such functional properties, such as the different configuration files read by an application at startup at all tiers, the processes started at each tier, and how different tiers exchange messages to complete processing of a given client request.

Properties in the performance category play an important role in identifying peak performance of the distributed system. For example, the cost of accessing different resources, such as network and storage, is a performance property, as it can clearly impact the overall performance of the system. Identifying these performance related properties can enable users to estimate the achievable performance in the new deployment and can point to root causes of any undesirable performance. One way to identify these properties is to measure the base cost of reading and writing to a storage device or to measure the capacity of the network link between different components of the service. Additionally, the resource usage of each request can be monitored during processing at the original deployment at block 104 and can be compared, at block 110, to resource usage monitored in the destination deployment at block 108. The operators or users of a service can also provide stress tests and expected throughput and latency results. The embodiment 100 can run these tests in the destination platform.

With regard to security related properties that the embodiment 100 can obtain, mechanisms that affect the overall security of the service are considered. For example, some network ports might be blocked by default in the destination platform and if the application uses these ports, it will not work correctly after migration. Moreover, applications may have IP or hostname based access control filters that control what servers can be accessed by what other servers. For example, the application server may only be accessed by the webserver and network packets from any other server should be rejected. These types of control filters are examples of security related properties that the embodiment 100 can obtain. The embodiment 100 need not be a tool that is configured to estimate the security threats that will appear after migration (even though the user defined tests can check for them). Rather, the embodiment 100 can focus on whether certain security related features work correctly in the destination deployment.

The properties described above characterize the base system when there are no faults. However, enterprise applications have sophisticated mechanisms to handle failures for high availability and the embodiment 100 can ensure that such mechanisms continue to work as expected in the new deployment. Such mechanisms are reliability and durability properties. For example, whether the crash of a component leads to a loss of data even after a component comes back online can be an indication of the migrated system's reliability.

By measuring these properties, the embodiment 100 can improve its coverage of the fundamental characteristics of the original system. In particular, the embodiment 100 can increase the accuracy of predicting success of a migration by increasing the number of properties the embodiment identifies and tests.

Figure 2:
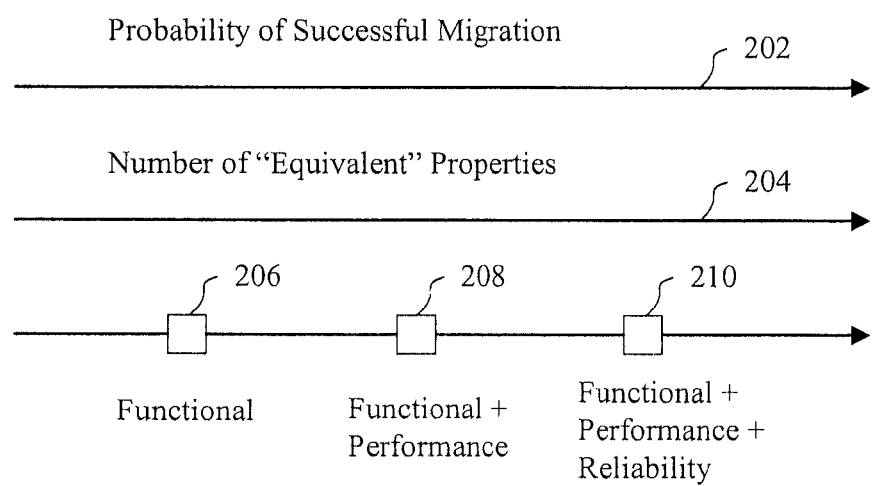
FIG. 2 is a diagram illustrating the relationship between a successful migration and the number of properties of a migrated system that are equivalent to corresponding properties in an original system on a source platform.

Referring now to FIG. 2, with continuing reference to FIG. 1, it is noted that the chances of a successful migration 202 increases with the number of "equivalent" properties 204. For example, a migrated system that has both functional and performance equivalence 208 with the original system is more likely to be successfully migrated than a migrated system with only functional equivalence 206. In turn, a migrated system that has functional, performance and reliability equivalence 210 with the original system is more likely to be a successfully migrated than a migrated system with only functional and performance equivalence 208. It should be noted that the exemplary embodiment 100 gives a probabilistic guarantee about the success of a migration, as the testing framework can only test a finite number of properties. However, it should be understood that the specific examples of properties described herein are not the only properties that can be tested by the system 100, as the system can be configured to test additional properties.

Returning again to block 104, to detect the properties described above, tests can be applied at block 104 to determine such properties in a black-box fashion. Any one or more of three approaches can be applied at block 104 to detect these properties: "first principles" tests, analysis of execution traces, and manual testing.

First principles tests utilize the domain knowledge of how different distributed systems work in practice. For example, to communicate correctly, the IP address of an application server present in the configuration file of a web server should match the actual IP address of the application server. Thus, at block 104, configuration files of the system on the original platform can be examined and the configuration files including an IP address of an application server that matches the actual IP address of the application server can be selected as a functional property of the system. Moreover, the server processes should have identical access rights to read/write data to the local data store as in the original deployment. Further, server processes should have the ability to communicate over the network. For reliability, block 104 can inject failures and can observe if the service continues to work properly. For performance related properties, the peak performance of accessing different resources, e.g., peak network throughput, peak data rate of storage, CPU processing peaks, access latency of a storage device, etc., can be measured at block 104. It should be noted that these tests are generic and are not tied to any one specific application. Further, the tests do not require any input from the application operators.

In accordance with other tests for detecting properties of a system at block 104, execution traces can be analyzed. To learn how different components of a system cooperate to process client requests, the embodiment 100 can monitor the system in action at block 104. For example, by analyzing the tcpdump (a standard tool available in both Linux and Windows to observe network traffic at a host) trace at each component of the service, the different network identities accessed by the service to complete the processing can be identified at block 104. If the black-box approach is applied in the embodiment 100, the embodiment expects the application operators or users to supply a way to generate the expected workload.

Manual tests can also be applied at block 104 to discover properties of the system. For example, if possible, the operators can manually provide a set of properties and a means to evaluate these properties. For example, the size and cryptographic hash of the index.html file can be input to the embodiment 100. In addition, at blocks 104 and 108 the size and cryptographic hash of the index.html file can be determined for the system in the original platform and the system in the target platform, respectively. Further, at block 110, the system/method 100 can check if the contents of the file are as expected. Many components of the enterprise applications, e.g., the database application or the web server, each come with their own sophisticated suite of unit tests, which can be identified by the user and input into the system. The unit tests can be run automatically at blocks 104 and 108. The results of the tests can be examined and compared to check if each component in the migrated system is behaving as expected.

It should be understood that block 110 of the system/method 100 can test the equivalence of properties in a variety of ways. As indicated above, the properties of the distributed system in both the source deployment and the destination deployment can be determined at blocks 104 and 108, respectively. As also indicated above, the likelihood that the distributed system in the new deployment is equivalent or behaving similar to the source deployment increases with the number of matched properties. This observation is based on the assumption that each property checks a different characteristic of the distributed system and increasing the number of matched properties increases the coverage of the tests, and thus improves the chances of a correct migration.

To clarify what it means for a property to match at two deployments, a comparator function can be defined and applied for each property. The comparator function can take as input two evaluations of a given property and outputs a YES/NO result. By keeping the definition of a comparator function abstract, multiple instantiations of the comparator function based on the type of a property are permitted. For example, checking whether the evaluations of the property on the source and destination deployment are identical is one such comparator function. However, outputs may not match completely between a source deployment and a migrated system even when there are no errors and a successful migration has occurred. For example, the disparity between the two systems may be due to inherent non-determinism in the system implementation, which can stem from timestamps, random numbers generated, etc. Moreover, the difference in outputs could be purely syntactic. As such, to be comprehensive and generic, the embodiment 100 employs an appropriate comparator function that can take such nondeterministic behavior into account. It should be noted that the embodiment 100 can be configured to define and employ new comparator functions based on user-input or based on past migrations the system/method had implemented.

In accordance with one aspect of the embodiment 100, three default comparator functions can be employed at block 110: (i) strict, (ii) approximate for numerical properties and (iii) structural approximate equivalence for non-numerical properties.

Regarding the strict comparator function, for correctness properties, the matching of properties in the original system at the source platform and the corresponding properties in the migrated system at the destination platform must be exact. This is because these properties are critical and any difference indicates an error. For example, if the number of processes started at the destination platform when the service is initiated is not identical to the processes running in the source deployment, then it is likely that the migration is problematic since the request execution may depend on the missing process. In addition, when the read/write access to the destination storage is not identical to the read/write access to the storage at the source, it is also likely that the system after migration may not work properly in the new deployment. Thus, at block 110, the strict comparator function can be applied for read/write access to storage and for the number of processes started when a service is initiated.

The approximate numerical comparator function can be utilized at block 110 to handle the legitimate non-determinism present in many system implementations, such as the timestamps and random number generated. For example, the performance related properties are considered. Here, it is not necessary that the peak number of write operations performed by a storage interface match exactly the number at the destination deployment. Rather, an approximate matching within an error threshold, e.g. of up to 1-5%, may potentially be acceptable for performance properties. Thus, any performance properties measured at the target platform that match the performance properties at the source platform within a predetermined error threshold of up to 1-5%, for example, can be deemed to be a match at block 110. The embodiment 100 can implement multiple experiment runs to obtain statistical meaningful values of such performance related metrics, and their corresponding acceptable error threshold, on which the approximate numerical comparator function can be applied at block 110.

As indicated above, non-determinism may also cause the network interactions between different components of a networked system to diverge even in the absence of an error. For these types of scenarios, the approximate structural comparator function can be applied to the associated properties at block 110. Identifying acceptable deviations due to non-deterministic nature of application logic is difficult using a single numerical metric. Thus, an approximate structural comparator function can be configured to compare the high-level characteristics of the network traffic generated between different components. For example, consider network message interactions between the different tiers of a multi-tier e-commerce site to complete a client request. The web server receives the request and then sends possibly multiple messages to the application tier. The application tier can, in turn, send multiple messages to the database tier or, in case of caching, may send a reply directly back to the web server. By observing the network behavior of the distributed system, a graph-based structure of the network communication can be constructed at blocks 104 and 108. In addition, graph comparison algorithms can be utilized at block 110 to estimate and assess the differences between two deployments of a system. One exemplary process that employs graph-based structures in this manner is described more concretely herein below.

Figure 3:
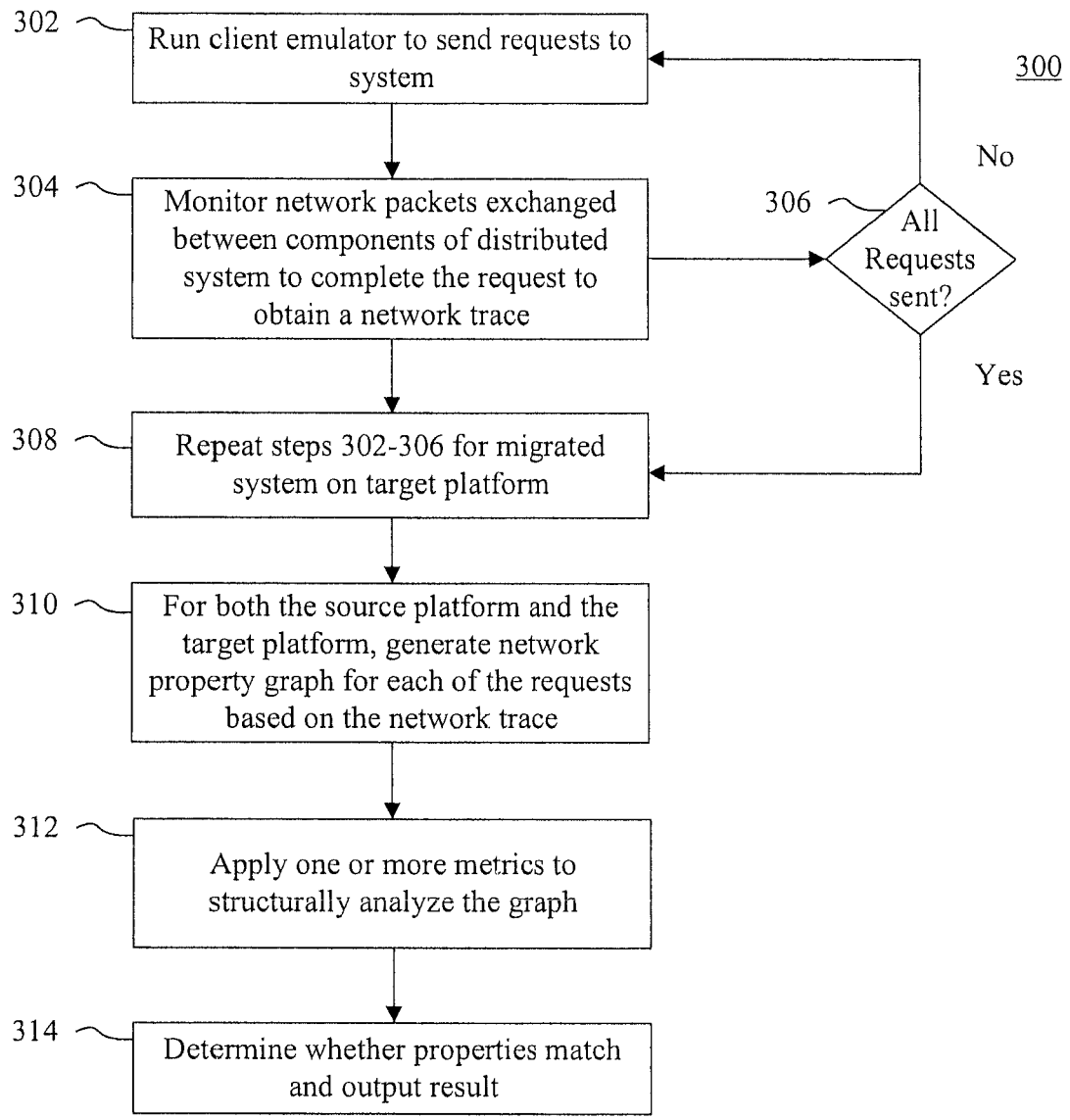
FIG. 3 is a flow diagram of an embodiment of a method for analyzing network properties of a system at a source platform and network properties of a migrated system at a target platform.

Referring now to FIG. 3, with continuing reference to FIG. 1, an exemplary method 300 for analyzing network properties of a system at a source platform and network properties of a migrated system at a target platform is illustrated. In particular, the system 100 can perform the method 300 to identify and compare the network level properties of a distributed system to identify if there are migration errors. As indicated above, the tests applied do not require understanding the content of the messages being exchanged between different components.

The method 300 can begin at step 302, in which the learning block 104 can run a client emulator that sends requests to the system at the source platform. Here, the operators or users of the system can provide the system 100 with the client emulator and a way to run the emulator. To avoid network packets associated with different requests from interfering with each other, the different client requests are transmitted in isolation.

At step 304, the learning block 104 can monitor the network packets exchanged between components of the distributed system at the source platform to complete the request and thereby obtain a network trace. For example, the learning block 104 can use the standard tcpdump facility to collect the network packets exchanged. Because the requests are transmitted in isolation, the learning block 104 can accurately monitor how messages are exchanged between the client and the service components. It should be noted that these network traces are present at different nodes of a system. Thus, here at step 304, the learning block can combine these traces into a single network trace for a given request. As such, the learning block can be configured to match the sending of a network message from one node to a reception of the same packet at another node. It can be assumed that the clocks of different nodes are synchronized; this can be easily achieved via network time protocol (NTP). Accordingly, the learning block 104 can extract the network packets sent by each node, can combine them and can sort them using the packet sent times. Because client requests are sufficiently separated due to their transmission in isolation, interference from the network traffic generated for other client requests is avoided. Method 300 is based on the assumption that there is an absence of packet loss; however, the method can be extended to cover the case in which packet loss is possible.

As indicated above, each client request can be transmitted in isolation. Thus, at step 306, the learning block 104 can determine whether all requests have been sent. The number of requests transmitted by the client emulator can be based on design choice. If not all requests have been transmitted, then the method can proceed to step 302 and can repeat for another given request. If all requests have been transmitted, then the method can proceed to step 308.

At step 308, the testing block 108 can perform steps 302-306 in the same manner in which the learning block 104 can perform steps 302-306, except that the testing block 108 performs steps 302-306 for the migrated system on the target platform. In this way, for each request transmitted at step 302, the system 100 can obtain two network traces, where one network trace corresponds to the system on the source platform and the other network trace corresponds to the system on the target platform. It should be noted that the steps 302-308 directed to the source platform and the steps 302-308 directed to the destination platform can equivalently be performed simultaneously. For example, the migration at block 106 can be performed prior to the learning steps at block 104 and prior to the performance of the method 300. Here, the same request can be sent simultaneously at step 302 to the systems in both platforms and the network packets exchanged by both systems can be monitored simultaneously to obtain respective network traces at step 304.

Figure 4:
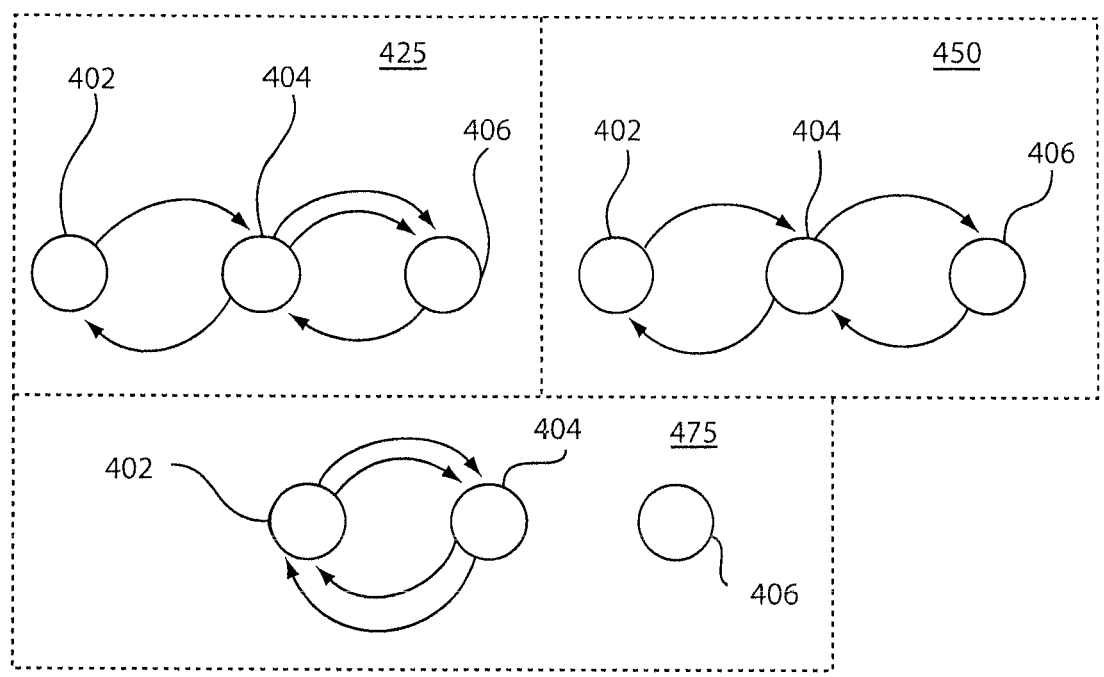
FIG. 4 is a diagram of exemplary graph-based structures generated to model network properties.

At step 310, for both the source platform and the target platform, the comparator block 110 can generate a network property graph for each of the requests transmitted at step 302 based on the corresponding network trace for the corresponding request. In particular, the network property graph can model one or more network properties in the original or migrated systems. For example, the comparator block 110 can represent a network message trace as a graph G=(V, E), where V represents the nodes of the network and E represents the edges between every pair of nodes. Each edge E stores the total size (S) and count (C) of all messages exchanged on the given node pair. FIG. 4 provides an example of three simplified network property graphs 425, 450 and 475, each of which illustrates the network traces between the same nodes 402, 404 and 406 for the same request for different instances of execution of an application. In particular, FIG. 4 illustrates three graphs representing network traffic between three nodes of a dummy application. It should be noted that none of these graphs are identical but are possible outcomes of a correct application in different executions. Accordingly, the comparator block 110 can examine the differences in the structure of the graphs. For example, consider the difference of total edges between the graph 425 and the other graphs. In both cases, the difference is 1; however, the graph 450 appears more similar to the graph 425. Intuitively, it can be assumed that a correctly running system has more numbers of distinct pairs successfully communicating with each other as compared to a faulty system. It should be further noted that the graph 475 can also represent a correctly behaving system when, for example, the node 404 is able to provide the response to the node 402 by using its local cache. Therefore, the comparator block 110 should know an acceptable deviation between two network trace graphs. Because it can be assumed that the system in the existing deployment (i.e., at the source platform) is working correctly, it provides ground truth to determine an acceptable deviation.

At step 312, the comparator block 110 can apply one or more metrics to structurally analyze the graphs. For example, to determine the equivalence of two network traces, the comparator 110 can apply any one or more of three metrics to compare these graphs structurally. Given two graphs G1, G2, the comparator block 110 can first compute the relative edge count difference, defined as $$M_C = \sum_{\forall k \in E} \frac{|C_1^k - C_2^k|}{C_1^k + C_2^k}.$$

Intuitively, the difference of the total messages (C) sent on each edge between two graphs are calculated and then the calculated differences are summed over all edges. Here, a low value of the metric should indicate a high likelihood of a match. Relative values are computed here, as the network graph structures for different request types are compared. It should be noted that the network graph structure for different requests might be very different (e.g., some may involve downloading multiple images from a database while others may simply access the index.html file cached at the application server). Thus, comparing the absolute value of the difference may not be meaningful.

The next metric that can be utilized by the comparator block 110 at step 312 measures the relative edge weight difference, defined as $$M_S = \sum_{\forall k \in E} \frac{|S_1^k - S_2^k|}{S_1^k + S_2^k}.$$

Intuitively, the difference of the total size (S) of all messages sent on each edge between the two graphs is calculated. Again, the relative difference is calculated here. The third metric, represented by $M_E$, counts the number of error edges between the two graphs. Here, an error edge is an edge that has non-zero messages flowing in one graph but zero messages flowing in the other graph. Accordingly, at step 312, the comparator block 110 can count the number of such error edges between the two graphs and can apply the number as the value of the metric.

Because the metrics applied are statistical, the embodiment 100 can learn the acceptable error or error threshold by performing the network tests multiple times in the source deployment (which is assumed to be working correctly). For example, the acceptable error for a given metric can be the largest difference of values of the given metric obtained from tests conducted in the properly operating system on the source platform. The statistical determination of the acceptable error can be performed at the preparation block 102 prior to the performance of the method 300. Alternatively, the statistical determination can be performed in the learning block 104 and/or at step 304, when implemented at the source platform. Accordingly, the learning block 104 can determine the acceptable error threshold by transmitting a given request multiple times to the system on the source platform to generate a corresponding plurality of network traces. Further, the learning block 104 can generate initial graph-based structures that model a given network property and that are based on the same initial conditions, such as a request sent at step 302 that is used to generate the plurality of network traces on which the initial graph-based structures are based. Further, the learning block 104 can select the threshold based on differences between the initial graph-based structures. For example, as noted above the learning block 104 can select the error threshold, for a given request, as the largest difference of values of a given metric obtained from tests conducted in the system on the source platform for the given request. The comparator block 110 can use the determined acceptable error at step 312 to determine whether a network trace for a given request obtained for the system in the source platform is equivalent to a network trace obtained for the same request in the migrated system in the target platform. It should be noted that, to improve efficiency, the graph structures of the system at the source platform to which the comparator compares the graph structures determined for the migrated system at the destination platform can be one or more of the initial graph-based structures.

At step 314, the comparator block 110 determines whether the network properties of the original system and the migrated system match based on one or more of the determined metrics and outputs a corresponding match/mismatch result. For example, the comparator 110 can determine that network traces for a given request for the two systems are equivalent when the metrics $M_C$, $M_S$ and $M_E$ determined for the target system are each within their respective acceptable errors of the corresponding metrics $M_C$, $M_S$ and $M_E$ determined for the source system. Alternatively, the comparator block 110 can determine that network traces for a given request for the two systems are equivalent when one or two of the metrics determined for the target system is or are within their respective acceptable error thresholds of the corresponding metric(s) determined for the source system. Further, the comparator block 110 can determine that the network properties of the original system and the migrated system match when a large percentage of the network traces (determined for each request) match based on the acceptable errors. However, the precise percentage very likely varies with respect to the system that is migrated. Thus, in accordance with one exemplary aspect, the comparator block 110 can output the equivalency result of the comparison of the network trace obtained for the original system for a given request and the network trace obtained for the migrated system for the given request. Further, the comparator block 110 can output each of the equivalency results determined for every request to enable the user or operator to determine whether the migration was successful based on the particular aspects of the system that was migrated.

It should be noted that the $M_C$ metric may be sensitive to the differences in the maximum transfer unit (MTU) of the source and destination network. For example, if MTU is 1400 B in the source deployment and 700 B in the destination deployment, twice the number of messages will be observed in the destination deployment. However, the relative edge weight difference metric $M_S$ is robust to this behavior and will be accurate.

Figure 5:
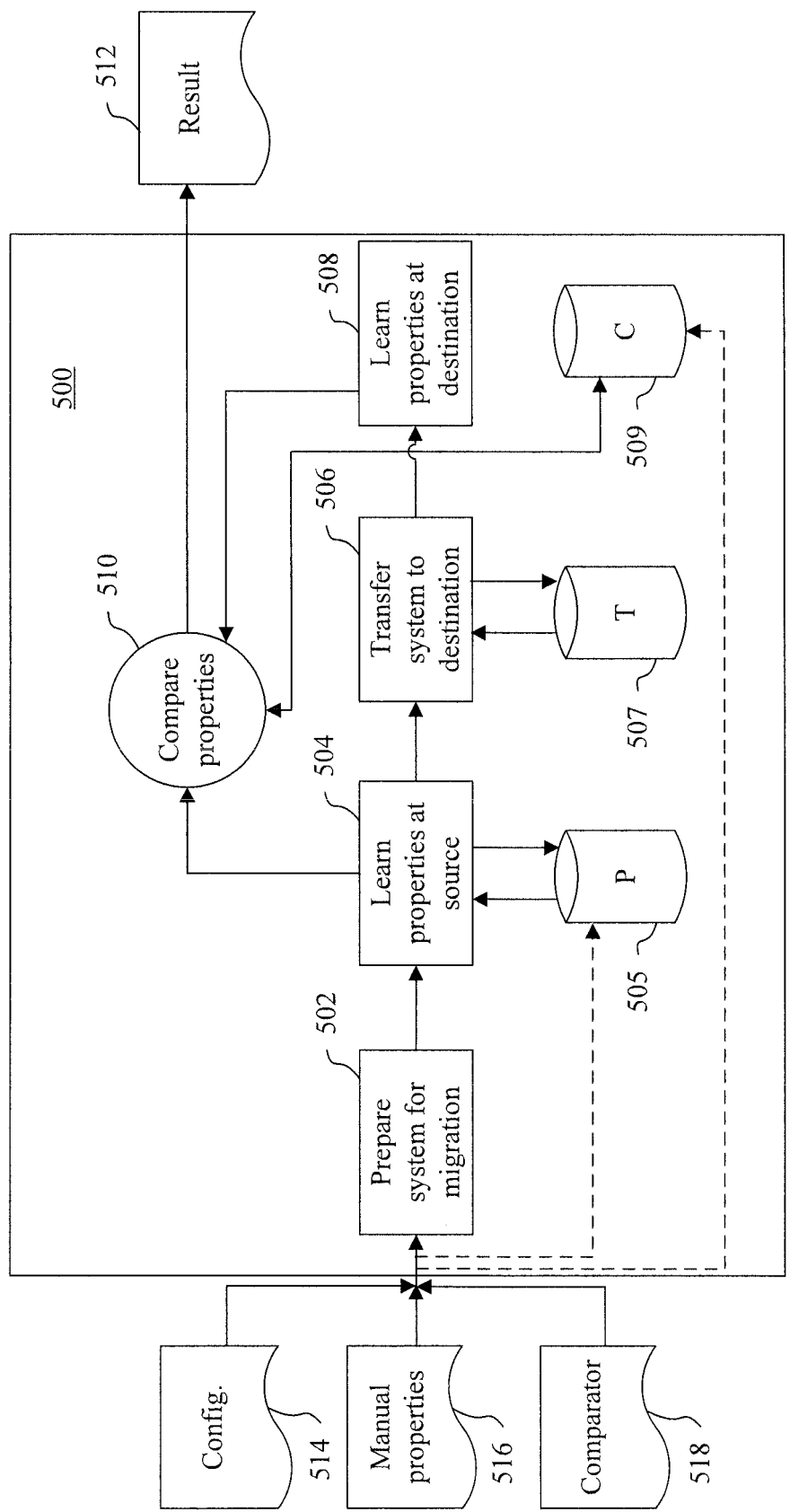
FIG. 5 is a block/flow diagram of a more specific embodiment of a method/system for migrating a system between platforms.

With reference now to FIG. 5, with continuing reference to FIG. 1, a block/flow diagram of a more detailed embodiment of a system/method 500 for migrating a networked system from one platform to another is illustrated. In particular, the system/method 500 can be employed to determine whether the system migration is successful. The system 500 receives and processes inputs 514, 516 and 518 to output a result 512 indicating a success or failure of the migration of the system. For example, the result 512 can indicate whether one or more properties described above in the migrated system is/are equivalent to the corresponding properties in the original system on the source platform. Further, the system 500 can include a preparation module 502, a learning module 504 for the source platform, a transfer module 506, a learning module 508 for the destination platform and a comparator module 510. It should be understood that modules 502, 504, 506, 508 and 510 are exemplary implementations of the blocks 102, 104, 106, 108 and 110, respectively, described above. Thus, the features of blocks 102, 104, 106, 108 and 110 described herein can be incorporated into modules 502, 504, 506, 508 and 510, respectively. Similarly, the result 512 is an implementation of the output 112. Here, the modules 504, 506 and 508 can employ repositories or storage mediums 505, 507 and 509, as described in more detail herein below.

In accordance with the system 500, the operator or user of a service that is migrated provides a set of input information comprising configuration information 514 of the existing deployment, any optional properties 516, and a comparator function 516 to compare these optional properties. The preparation module 502 parses the input provided by the service operator and performs a set of actions, as described in more detail herein below. Further, the learning module 504 performs a variety of property tests to learn how the system behaves in an existing correct setup. In addition, the transfer module 506 includes mechanisms that transfer an existing deployment to a destination deployment. According to one aspect, if the system 500 does not know how to transfer the system in the source platform to a new destination Cloud infrastructure, it can learn the procedure based on inputs describing the transfer procedure provided by an operator or user. In turn, the learning module 508 performs a variety of property tests to learn how the system behaves on the destination platform. Modules 504 and 508 can be implemented as a single module, as the modules 504 and 508 perform similar functions. The comparator module 510 performs comparison of different evaluations of the sets of properties to estimate how the system in the destination deployment is performing.

It should be noted that the system 500 can be configured such that its knowledge base grows organically. Specifically, the Learn 504/508, Transfer 506, and Comparator 510 modules are extensible. For example, the Learning module 504 can internally maintain a database 505 of properties 'P' it tests and can extend the database 505 with other manual properties 516 that a user can provide. Similarly, the Transfer module 506 can maintain an internal database 507 of transfer procedures indicating how to perform both physical-to-virtual (P2V) and virtual-to-virtual (V2V) transfers for every new platform to which it is used to migrate a system. Further, the property comparator function is also extensible, as it is possible to design new comparator functions for existing properties (the database with initial C). It should be noted that a relationship between the P and C databases can be internally maintained to identify what tests to run for a given property. Accordingly, modules 504/508, 506 and 510 can be configured to reference and update corresponding databases that include information detailing tests, transfer procedures and comparator functions employed during past migrations.

Returning to the inputs that can be provided by a user or operator, the configuration information 514 can include information about the existing deployment. The configuration information 514 can include an IP address of each component and an access login with appropriate credentials to enable the system 500 to start and stop the service at these nodes. Further, the information 514 can include a description of how to start and stop each component of the system. For example, for the web tier of the RUBiS system, the command to start the http tier (/sbin/service httpd start) should be provided in the information 514. The input 514 can also include information about how to take a snapshot of the state maintained by each component. For example, the database tier of the RUBiS system is MySQL and it provides the mysqldump command to take a dump of all SQL queries executed thus far. This information enables the learning module 504/508 to ensure that any modifications made to learn the properties do not affect the application state. The information can be provided in the input 514 in a simple key-value pair data structure that can be read by the system 500. In addition, to enable the learning module 504/508 to learn the network related properties, the operators can provide a client emulator permitting the learning module to observe the network behavior, as described above. A sample input file is provided below in Table 1.

TABLE 1

Sample Input File

%%% Basic configuration
[Service]
servers = 3
[ServiceName]
server0 = DB
server1 = APP
server0 = WEB
[ServerLocationSource]
ip2 = 155.98.36.241
ip0 = 155.98.36.244
ip1 = 155.98.36.240
[ServiceStartupCmd]
service2 = /sbin/service mysqld start
service1 = /sbin/service jboss start
service0 = /sbin/service httpd start
[ServiceShutdownCmd]
service2 = /sbin/service mysqld stop
service1 = killall java
service0 = /sbin/service httpd stop
[ServiceResetStateCommand]
service2 = mysql -u root -p9gh14$3 rubis
< rubisdump-2010-24-15.sql
service1 = echo "No State"
service0 = echo "No State"
[IP AddressAssignmentAtDestination]
mode = DHCP % DHCP|MANUAL
[ClientLocation]
ip = 155.98.36.223
%%% Information for performing trace-driven
%%% testing
[ClientStart]
warmup = cd ~RUBiS-Client; cp
warmup.properties.emulab rubis.properties;
make client; make emulator
singleclient = cd ~RUBiS-Client;
cp single_client.emulab rubis.properties;
make client; make emulator
outputlocation = ~RUBiS-Client/

Returning to the preparation module 502, as described above, the preparation block can prepare the existing deployment such that it permits the learning module(s) to learn properties of the system. To implement the preparation module, the system 500 can have a few basic services installed: strace, tcpdump, php, python, and php xml. The services php and php xml can be used to access a destination platform's service to store control information for running tests. Before performing the transfer of virtual machines (VMs) from one testbed to another, the transfer module can install a small agent program on the virtual machine (VM) that is started on VM boot up. The agent can be responsible for two tasks: a) upload the IP address of the machine on which it is running to a well defined location in the storage provided in the destination platform, and b) read the same store for the IP address information of other nodes in the service.

As indicated above, the learning module 504 can determine a first set of properties of the networked system on a source platform in a first administrative domain, while the learning module 508 can determine a second set of properties (of the same types as the first set of properties) of the transferred system on the destination platform. For example, as discussed above, the learning module 504/508 can employ a variety of tests to learn the properties of the system in the source platform and/or in the destination platform. For example, the learning module 504/508 can determine functional properties and at least one of: performance properties, security properties or reliability properties for the system on the source platform and for the system on the destination platform. In turn, the comparator can compare the respective properties obtained for the original system and the migrated system, as described in more detail herein below, to determine whether the system migration was successful. Table 2, below, describes a listing of tests and examples of properties that can be determined by implementing the tests. Features of tests and properties listed in Table 2 were described in detail herein above.

TABLE 2

Classification of various properties and how to detect them

| | Basic functional | Performance | Reliability/Security |
|---|---|---|---|
| First principles | Configuration information. IP addresses are consistent. Read/write to local store. Communicate over network. Processes started. | Peak performance of different resources, e.g., CPU, network, storage. Latency to access resource. | Durability of data. Availability of service. |
| From data/trace Manual | Network profile for each request. Size and cryptographic hash of a deterministic response. | Cost of each critical operation. Throughput. Latency. | Access control. |

With regard to functional properties, to identify the configuration files read by a service at startup, the learning module 504/508 can run the standard operating system strace facility to monitor the different files opened by the service as well as all its children. Given these sets of files, which can include system files, libraries, and configuration files, the learning module 504/508 can then filter out the configuration files. Here, the learning module 504/508 can simply search for the hostname or IP address of all servers in each of the files returned by strace. All these files should be updated with destination platform information. The learning module 504/508 can take a diff of the "ps–aux" command before and after starting the service to obtain the name of new processes started after the service is launched. For the network connectivity property, the learning module 504/508 can send a ping message from each node of the deployment to all other nodes. For the read/write property, the test is again simple: the learning module 504/508 can first write a deterministic value of increasing size and can then read it and check for equality.

To test for durability in a system at the source or destination platform, the learning module 504/508 should determine whether the application state survives a crash fault. In this implementation, consideration of Byzantine faults is omitted. To check for durability, the learning module 504/508 can first write a deterministic value to the data store and can then terminate the node (power down). After powering on the node, the learning module can check if the read is successful and returns the same value. If so, then the system possesses the durability property.

With regard to availability properties, many networked services implement complex availability protocols that provide high availability in presence of failures. These protocols implement server replication and can survive a preconfigured number of server failures. To check if the replication protocol is behaving correctly, the learning module 504/508 can apply a generic test. Specifically, it can be assumed that the customer provides a set of N nodes and a fault tolerance of C and that the service is available even when up to C servers can fail. It can be further assumed that the customers provide the system 500 with a way to access the service. The learning module 504/508 can fail C servers concurrently and can access the service at remaining nodes. Before failing the next subset of C servers, the learning module 504/508 first restarts the previously failed servers. This process is performed for every possible subset of C servers. The learning module 504/508 determines that the replication protocol is working correctly if the service is available during this test (i.e. for all of the possible subsets of C servers for which this process performed).

As described above, after learning the properties of the system in the source platform, the system 500 can transfer the service images to the destination platform. The transfer module 506 provides support for migrating both virtualized (V2V) and non-virtualized (P2V) source deployments of a service to a destination virtualized platform. The VMs obtain their IP addresses in a dynamic fashion and this introduces a challenge, as the system 500 uses the IP address to run its tests.

To address the problem, the particular features of the destination platform should be considered. For example, Emulab, a research cloud platform available for researchers, provides access to the virtual machine manager (VMM) on which the system 500 can migrate virtual machines. Thus, the learning module 508 can use the VMM to determine the relevant IP addresses. Amazon EC2, on the other hand, provides an application program interface (API) to bundle images to their infrastructure and does not provide access to the VMM layer. In both cases, the VM's obtain their IP address via dhcp. For testing purposes, as indicated above, learning module 508 should obtain these IP addresses. Here, the learning module 508 can utilize Amazon's SimpleDB structured storage service to store this control information. Specifically, a small daemon can be installed in each of the migrated VM. The daemon reads the IP address using /sbin/ifcfg command and stores it with the name of the tier and the platform in SimpleDB. After a few minutes or seconds (large enough to boot the VMs), the learning module 508 reads this information from the SimpleDB database.

After the system is migrated to the destination platform, the comparator module 510 can determine whether the functional properties, the performance properties, the security properties and/or the reliability properties of the migrated system at the destination platform are equivalent to the corresponding functional properties, the performance properties, the security properties and/or the reliability properties, respectively, of the original system at the source platform, as described above with respect to block 110. For example, the comparator function can select a comparator function from a plurality of comparator functions based on the given properties compared and can apply the selected comparator function to the given properties. For example, based on the given properties compared, the comparator 510 can select an appropriate comparator function from a set of comparator functions comprising a strict comparator function, an approximate numerical comparator function and an approximate structural comparator function.

Further, after the migration testing is complete, the comparator 510 can present an indication 512 that the transfer of the system to the destination platform was successful or was a failure. For example, the result 512 can include the results of all, or at least a portion of, property tests applied by the comparator 510 and/or by the learning module 504/508 and can be presented to the user in a human readable format. In addition, the result 512 can further include a result of an automatic determination of whether the migration was a success based on the results of the property tests.

As indicated above, an important challenge in migrating systems to the Cloud is to ensure that the application continues to work correctly after migration. Specifically, the configuration data of the application should be discovered and then consistently updated after migration. For example, configuration data related to the network, storage, and performance aspects of the application (e.g., IP addresses, location to store the logs, and maximum number of threads) should be discovered. Accordingly, additional exemplary embodiments directed to the learning blocks 104 and 504 and the discovery of configuration data are described in detail herein below. In particular, these embodiments incorporate two approaches to automatically discover the network related configuration data and where such configuration data is stored for multi-tier enterprise applications. However, it should be understood that the configuration data discovery features implemented by the exemplary embodiments described herein below are not limited to cloud migration. Indeed, many traditional software management tasks, such as upgrading software modules, replacement, and debugging, involve the discovery of configuration data so that operators can manually inspect them for errors and make corrections, if necessary. It should also be noted that the exemplary embodiments described herein below can discover the configuration data without employing deep knowledge of the applications.

The exemplary embodiments described herein below can be employed to discover configuration data for an enterprise application to ensure that the data can be updated consistently after migration. For example, if each tier obtains a new IP address in the cloud, then the IP address present in every configuration file that contains the old IP address (such as application level configuration files as well as network level access control filters) should be updated. The configuration data is not limited to the tiers of the application, as these networked applications also typically depend on a variety of external support services, such as firewalls, domain name servers, and authentication servers. Once the configuration data is discovered, it is also desirable to discover the dependencies among them so that the operator can update them consistently post-migration.

The network related configuration data, such as IP address, host name, domain names, and port numbers for a complex multi-tier application may reside in a large number of files. These files may be present in the operating system (e.g., Linux, or Windows) as well as application-specific directories. Moreover, such configuration data might be present in both text files as well as binary files. The exemplary embodiments described herein below consider configuration data present in text files.

As indicated above, two innovative approaches to discover such configuration data can be employed. Both approaches are application and operating system agnostic and are thus widely applicable. In the first approach, embodiments can discover the configuration data in use by utilizing standard operating system services, such as "netstat" and "tcpdump." This provides a list of IP addresses, hostnames, domain names, and port numbers. In addition, embodiments find the potential set of text files that may have such data. In accordance with the approach, all processes running in the system can be discovered and restarted to monitor the files opened by each process. The network tokens are searched in these opened files to find a list of potential configuration files. However, these potential configuration files may have false positives. To discover the true tokens, a novel testing approach can be applied that changes the potential tokens and identifies if the application's behavior changes.

In the second approach, processes need not be restarted and a testing approach need not be applied. Here, domain knowledge on how configuration files are typically accessed and modified in the system are used to estimate the list of potential configuration files. Further, three heuristics can be employed to rank the remaining set of files, as discussed in more detail herein below.

Figure 6:
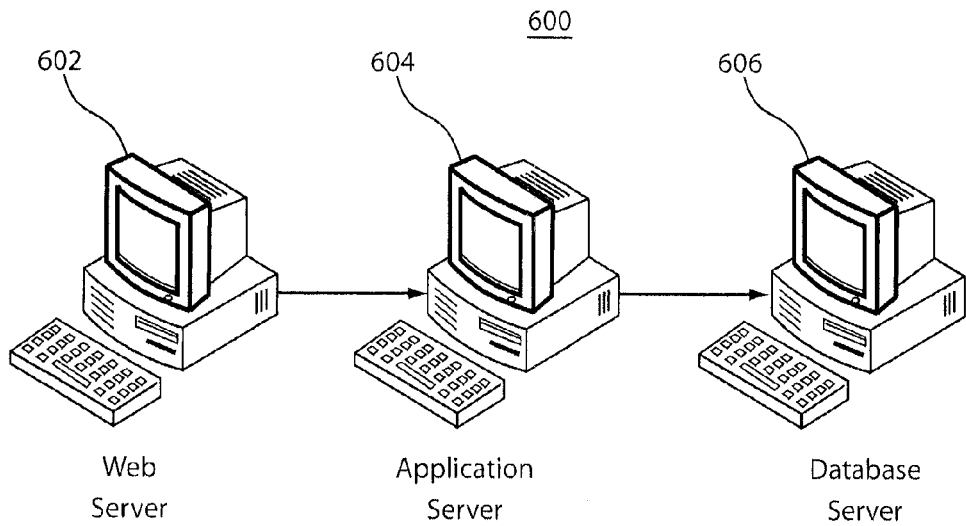
FIG. 6 is a block diagram of an exemplary system deployment at a source platform.

FIG. 6 illustrates a simple, exemplary deployment 600 of a typical multi-tier enterprise application. The deployment 600 can include a web server 602 (e.g., an apache server), an application server 604 (e.g., a JBoss Server) and a Database server (e.g., a MySQL server).

Figure 7:
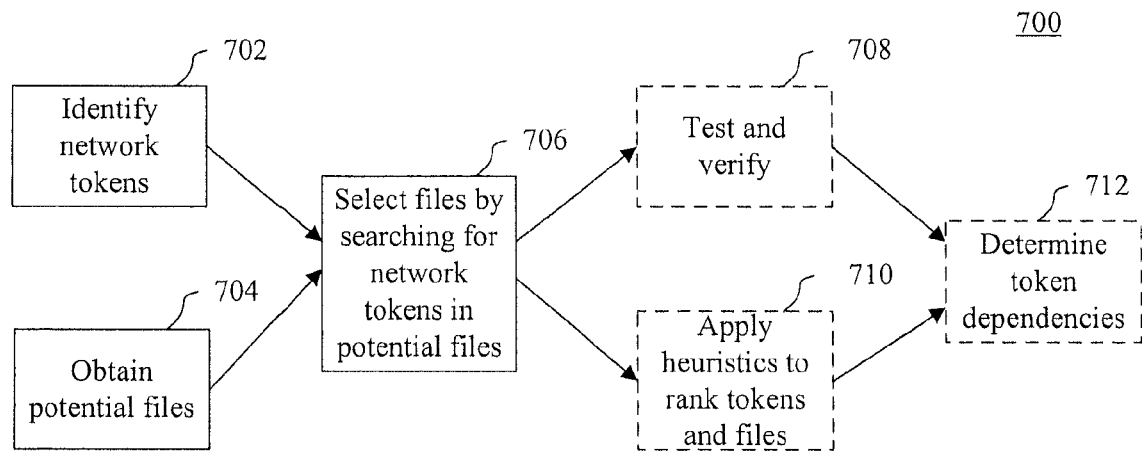
FIG. 7 is a block/flow diagram of an embodiment of a system/method for discovering configuration data.

Referring now to FIG. 7, with continuing reference to FIGS. 1 and 6, a block/flow diagram of a system/method 700 for discovering configuration data, configuration files and token dependencies is illustrated. An overview of the system/method 700 is provided initially. Thereafter, more specific implementation details are provided. It should be noted that the blocks/steps of the system/method 700 can be implemented/performed at each tier of the application. However, only a single tier is shown in FIG. 7 for expository purposes.

It should be understood that the system/method 700 can be implemented by or in the learning block 104, described above. Furthermore, the embodiment can be implemented as a system of modules. For example, block 702 can be implemented as a token identifier, block 704 can be implemented as a configuration file discovery module, block 706 can be implemented as a searching module and blocks 708 and 710 can be implemented as respective testing modules and block 712 can be implemented as dependency detection module. It should also be understood that each of the blocks in the embodiment 700 can be implemented by a hardware processor (not shown) that is configured to retrieve and execute software instructions stored on a storage medium (not shown) to implement the functions of the blocks described herein below. Alternatively, each of the blocks can be implemented by an independent, respective hardware processor that employs one or more storage mediums from which it retrieves software instructions for execution to implement the functions of the respective blocks described herein below.

In accordance with the system/method 700, at block 702, network tokens can be identified. For example, IP addresses, host names, domain names and port numbers used by different service components can be detected as network tokens. As stated above, the tokens can be discovered by a running production service using well known tools. For example, to obtain the possible configuration token list, the tools tcpdump and netstat on the production system can be utilized. It should be noted that neither of these tools cause downtime of the service. Some kernel level services use prefixes (iptables); here, the token list obtained from these tools can be expanded to include all prefixes of IP addresses, which reduces false negatives (e.g., the infrequently used IP addresses will match the prefix of the server which is used). Domain names can be obtained at block 702 by including the suffix of hostnames. Another expansion can be made as a result of the network-related system calls, such as connect( ) and bind( ) made by the application when it is started (next step). The configuration token list can also be expanded at block 702 by including the parameters passed into these system calls.

At block 704, potential configuration files can be discovered or obtained. Here, the locations at which configuration tokens obtained at block 702 are stored can be determined so that an operator can modify them after migration, if necessary. The two approaches mentioned above differ in the way they discover such files. For example, in the first approach, all processes running on a service machine are restarted to monitor all the files opened by the process. An important observation is that a configuration file should be opened by the service to enable the service to use the configuration tokens present in the file. In particular, the configuration data of a service should be read by the service, as the contents of configuration files are passed as parameters to various activities performed by the service. In the second approach, the application(s) need not be restarted; rather, the approach uses the file access pattern and timing information to infer the potential configuration files. For example, because a configuration file is read by the service process, the access time of the file should be later than the service start time. Among all these opened files, only the text files can be considered as potential configuration files in this exemplary embodiment. The discovery block 704 is described in more detail herein below with respect to the two approaches.

At block 706, the potential files are searched to determine and select the files that include the network tokens determined at block 702. For example, a simple string search of the tokens found in block 702 can be performed in the files found at block 704. The search returns a list of potential configuration files along with the token value and the line numbers at which the token appears in these files. This block excludes the text files that do not include any of these configuration tokens.

The files found at block 706 may have false positives because the tokens may match non-network related data. To improve the accuracy, two alternate approaches can be employed. For example, at block 708, a test and verify approach can be utilized to find the true tokens and the true configuration files. Here, each of the tokens is changed and the service is restarted to observe if the external behavior of the process changes. Alternatively or additionally, at block 710, three heuristics can be applied to rank the list of configuration files obtained at block 706. Blocks 708 and 710 are described in more detail herein below. It should be understood that although block 708 is preferably implemented/performed with the first discovery approach and block 710 is preferably implemented/performed with the second discovery approach, both blocks 708 and 710 can be implemented/performed with any approach described herein. Further, although, preferably, only one of the blocks 708 and 710 are implemented/performed, it should be understood that both blocks 708 and 710 can be implemented/performed.

At block 712, token dependencies can be determined or discovered. For ease of understanding, block 712 is discussed herein below after a description of the first discovery approach.

Figure 8:
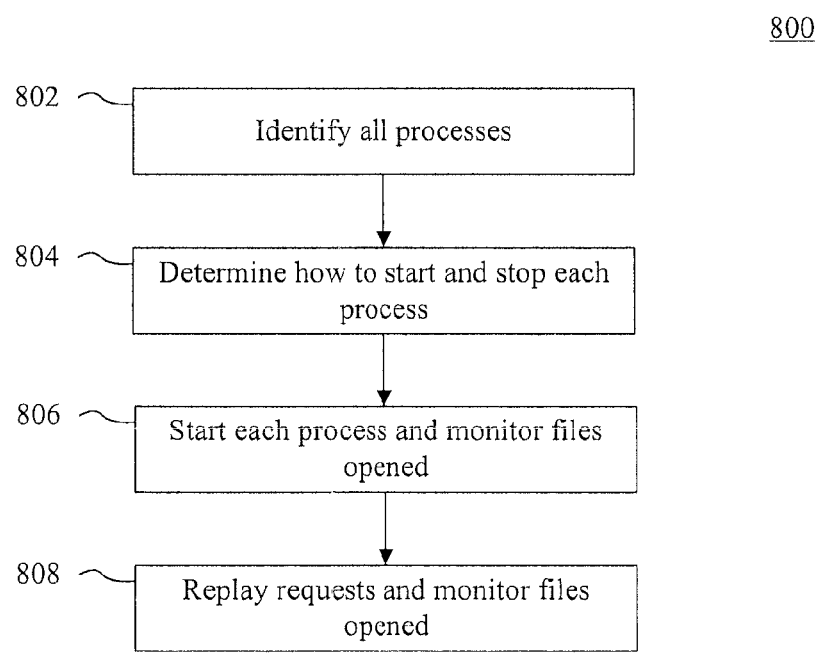
FIG. 8 is a flow diagram of an embodiment of a method for determining potential configuration files in a system.

Returning now to block 704, the first discovery approach is now described in detail. As indicated above, the goal of block 704 is to find the potential configuration files. An important idea is that the contents of a configuration file should be used by the process for performing network related tasks. For example, process apache httpd listens on port 80 after reading this information from file /etc/httpd/conf/httpd.conf. Thus, such a configuration file should be opened by the apache process when it starts. With reference now to FIG. 8, with continuing reference to FIG. 7, an exemplary method 800 for discovering potential configuration files is illustrated. The method can begin at step 802, in which the discovery block 704 identifies all running processes. Standard operating system facilities can be utilized to list the running processes. For example, "ps" in Unix based operating systems can be employed to determine the running processes.

At step 804, the discovery block 704 can determine how to start and stop each of the identified processes. Again, the discovery block 704 can use standard operating system facilities to obtain this information. However, determining how to start and stop the processes is challenging because this information is not always correctly reported by such facilities, especially for operating system daemons that are started as part of operating system boot up process. As such, the discovery block 704 should identify all operating system daemons that are configured to run at the boot up time and should use this information to implement step 804. In addition, the discovery block 704 can find command line parameters provided to a given process at the startup time. In Linux, the discovery block 704 can obtain this information using the "ps axw" command. However, for some kernel daemons (e.g., sendmail), the result produced is not accurate. Fortunately, these kernel services are started using a standard OS boot time sequence comprising sequential commands ("/sbin/service sendmail start"), which can be used by the discovery block 704 here. The discovery block 704 can replace "start" with "stop" to stop the service. The Windows operating system also provides mechanisms to list all services that are running in the system using the "net start" command.

At step 806, the discovery block 704 can start each of the processes determined at step 802 and can monitor the files opened by the processes. In particular, the discovery block 704 can discover all files opened by every process and can designate such files as potential configuration files and/or can include such files in a potential configuration file listing. Here, the discovery block 704 can use standard operating system facilities to achieve this task. For example, "strace" in a Unix based operating systems can be used to monitor the opened files and ProcessMonitor in Windows can provide this information. Such facilities can monitor various system calls made by a running process. Because "file open" is a system call, the discovery block 704 can obtain all files opened by the process by obtaining the parameters passed to the open( ) system calls. Typically, an application opens a variety of files, including libraries, configuration files, data files, and log files. In an exemplary embodiment, the directories, binary files, .jar, .tar, .rar, /dev files from can be excluded from the potential configuration files list, because these are non-text files. The remaining files can compose the list of potential configuration files.

At step 808, the discovery block 704 can replay requests and can monitor any files opened in response to the requests. For example, sometimes the network tokens are used only when valid client requests are received. Thus, the files that contain such tokens are not opened when the process is started. For example, Cherokee web server, MediaWiki front end, does not open the configuration file that contains the port number of the Postgres database server. Only upon receiving valid client requests, does the web server open a TCP (Transmission Control Protocol) connection by reading the configuration file and discovering the port number. To discover files that are opened in response to client requests, the discovery block 704 can record client requests from the production system and can replay these client requests. Alternatively or additionally, the discovery block 704 can apply a client emulator, as described above with respect to FIG. 3.

Figure 9:
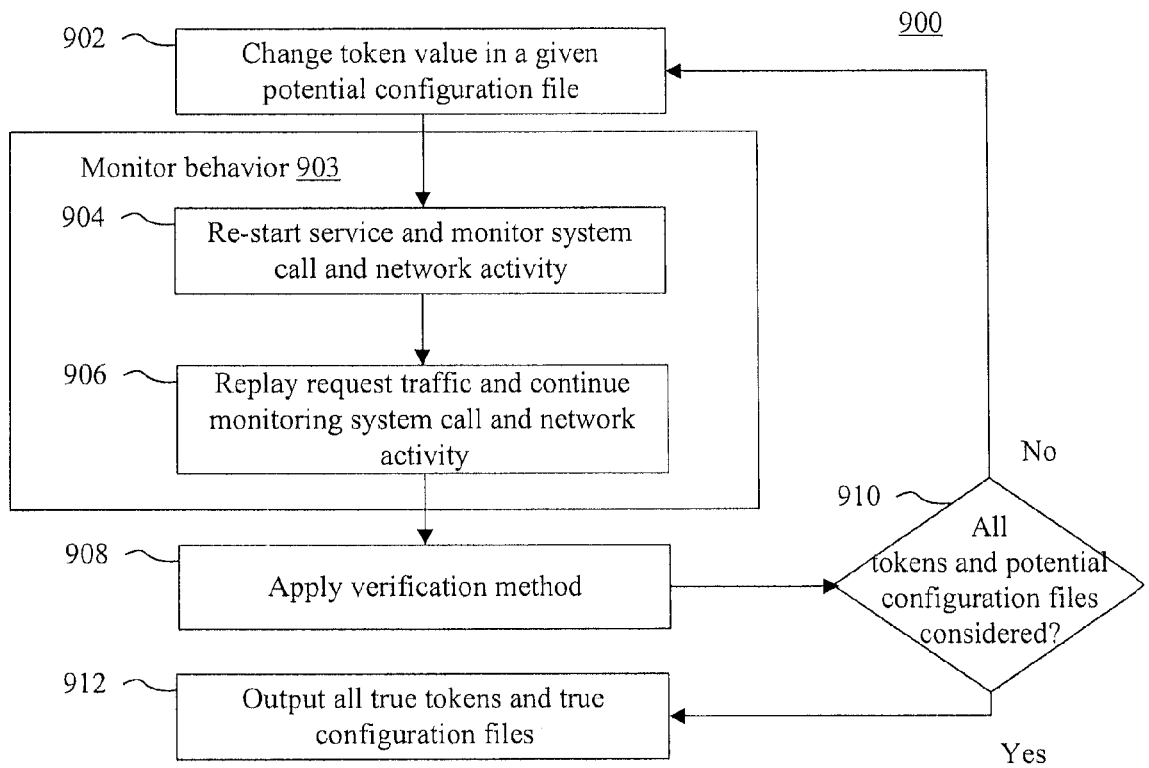
FIG. 9 is a flow diagram of an embodiment of a method for testing and verifying tokens and configuration files.

Returning now to block 708, as indicated above, the embodiment 700 can identify the true network tokens and true configuration files among all the files found at block 706. Informally, a true network token is one that, when changed, causes the external observable network behavior of the service to change. For example, if the port number of Apache httpd in /etc/httpd/httpd.conf is changed from 80 to 81, and the service is restarted, the httpd process will be observed listening on port 81. Here, the testing block 708 can change a given potential token value, can restart the service and can observe if the externally observable behavior of the service changes. FIG. 9 illustrates an exemplary method 900 for testing and verifying the network tokens and the potential configuration files.

The method 900 can begin at step 902, in which the testing block 708 can change a token value determined at block 702 in a configuration file selected at block 706. It should be noted that the syntax of IP addresses is unique (e.g., 138.15.15.15); thus the testing block 708 assumes these token values to be true tokens and does not perform testing to detect their correctness. For hostnames and domain name token values, the testing block 708 can append a string with value "test" in front of the given token value. For port numbers, the testing block 708 changes a port number to a value that is unused in the original system. For example, port 80 can be changed to port value 65534 or 65535, which are typically not used. It should be noted that, for network related tokens, multiple tokens need not be changed at once, as changing tokens one-at-a-time is sufficient. For example, changing a true token leads to a traceable change in the network behavior. For example, changing a port or an IP (internet protocol) address will lead the traffic to go to this IP address or port. Thus, the traffic will be immediately traced to the given port or IP address. Moreover, changing a hostname will immediately cause a DNS (domain name system) lookup for the new hostname, thereby enabling a trace to the changed hostname token.

At step 903, the testing block 708 can monitor the behavior of the system resulting from the change in the token value in the configuration file. Here, the testing block 708 can observe the applications' behavior using their system call activity and network activity. For example, the testing block 708 can restart the service using the "strace" facility that monitors the system calls and their arguments. Further, the testing block 708 can apply the standard "tcpdump" facility to monitor the network traffic sent and received by a host. The system call and network activities are agnostic to the application logic and operating systems and are thus widely applicable. Three possible kinds of changes in behavior can be expected: (1) a new token appears in the behavior, (2) a new traffic pattern emerges, and (3) some original traffic pattern disappears. The monitoring at step 903 can be implemented in two sub-steps. For example, at step 904, the testing block 708 can restart the service and can monitor the system call and network activity, as described above. For example, here, the learning block 708 can restart only those processes that read a given token that was changed at step 902. At step 906, the testing block 708 can replay request traffic and can continue monitoring the system call and network activities. The testing block 708 can replay requests as described above with respect to step 808. As indicated above with regard to step 808, for some tokens, application-level request replay should be applied. As noted above, certain dynamic configuration data can only be tested using a replay framework.

From block 706, the embodiment 700 finds the files where the token appears. Now, for each file, the embodiment 700 has learned the process that opens it from the discovery block 704. Thus, for each token, the embodiment 700 has learned in which file the token appears, how the token should be changed, and the process that should be restarted to check the validity of the token. Thus, for each token, the embodiment 700 can restart only those processes that read the file including the given token.

Table 3, below, provides an exemplary algorithm that the testing block 708 can perform to implement step 903. In the algorithm, TokenList is the list of all unique tokens, FList is the list of files that include the tokens, and PList is the list of processes that opens a given file.

TABLE 3

Algorithm 1

```
1: ∀t ∈ TokenList
2:     ∀f ∈ FList that has t
3:         ∀p ∈ PList that opens f
4:             restart p with strace
5:             monitor network using tcpdump
```

In accordance with Algorithm 1 of Table 3, for each potential token, the testing block 708 can obtain two new behavior files. For each potential configuration file in which the given token exists, the file is changed one after another. Every process that reads a particular potential configuration file in which the given token exists is restarted using strace and the system-call activity of the process is obtained. The testing block 708 also monitors the network activity using the tcpdump utility. Thus, the testing block 708, for each token, obtains two files: one including the strace-generated file and the other file obtained using tcpdump. It should also be noted that the testing block 708 obtains the strace and network activity files when none of the tokens are changed, as they describe the correct behavior of the application. This is useful to determine the differences introduced by changing a given token and checking the token's validity.

To check the validity of the token and of the configuration file examined, at step 908, the testing block 708 can apply a verification method. For example, based on the two files obtained at step 903, the testing block 708 can identify if a token is true based on the algorithm presented in Table 4, below. Here, the testing block 708 replaces a given token t with a test token t' and determines that the given token is a true token if: a) it identifies the test token in the system call activity or the network activity, b) it identifies at least one new traffic pattern in the network activity and/or c) it identifies the disappearance of at least one traffic pattern found during the monitoring conducted, for example, at step 806.

TABLE 4

Algorithm 2: Verification Algorithm

```
 1: if t is IP type then
 2:     Consider it a true token.
 3: if t is Hostname or Domain type then
 4:     If t changed to t', search t' in tcpdump file for DNS traffic.
 5:     if t' found then
 6:         t is a true token.
 7:     else
 8:         if New traffic appears or some old traffic vanishes. then
 9:             t is a true token.
10: if t is Port type then
11:     If t changed to t', search t' in strace file.
12:     if t' found then
13:         t is a true token. (Record the accompanying IP address.)
14:     if t' found in tcpdump generated file then
15:         t is a true token. (Record the accompanying IP address.)
16:     if New traffic appears or some old traffic vanishes. then
17:         t is a true token.
18: else
19:     t is a false token
```

As indicated above, all IP based tokens are assumed to be true tokens. If the token type is hostname, after changing the hostname token, the testing block 708 monitors the network activity of the host where the change was made. For example, the testing block 708 inspects the network packet payloads sent to the DNS server and searches for the new hostname token. If the testing block finds the new hostname token in the network activity, which in this example is the DNS traffic, then the testing block 708 determines the original hostname token is a true token (lines 3-6 in Algorithm 2 of Table 4). The testing block 708 performs a similar process for domain name tokens. For example, if the token type is a domain name, after changing the token value, the testing block 708 examines the network traffic to the DNS server. If the new value of the domain name token appears in the DNS traffic, then the testing block 708 determines that the original domain name token is a true token (lines 3-6 in Algorithm 2 of Table 4). Further, the testing block 708 also checks if a new network flow is generated or an old network flow disappears due to the token change. If so, then the testing block 708 infers that the token is a true token (lines 7-9), as illustrated with an example below.

Testing whether a port token is a true token or not is more complicated. For port numbers, after changing the port token value, the testing block 708 searches for the new value of the token in the network related system calls parameters. For example, the testing block can search for the new value of the token in system call parameters such as connect( ) and bind( ). Further, the testing block 708 can check if the token was changed from the old value in the original strace-generated file. If the testing block 708 finds the new value of the token, the testing block 708 determines that the original token is a true token (lines 10-13 in Algorithm 2 of Table 4). The testing block 708 also records the IP address associated with the token in the system call parameters. For example, the testing block 708 finds the format of an IP address in the same line and records this information. The dependency detection block 712 can use the recorded IP address to detect token dependencies, as described in more detail herein below.

If a new token value of the port is not found in the systems calls parameters, then the testing block 708 can search the network packet activity and can search for the new value. For example, the testing block 708 can search for the token in the tcpdump-generated file in the well-defined "port" position. If the testing block 708 finds the new token in the network packet activity, then the testing block 708 determines that the original port token is a true token (lines 14-15 in Algorithm 2 of Table 4). Again, the testing block 708 can record the associated IP address before the port to enable the detection of token dependencies at block 712.

The testing block 708, also at step 908, can examine the network packet activity to search for new traffic patterns due to the changed token or to determine whether an original network traffic disappears due to the changed token. Thus, if a new traffic patterns emerge or original network traffic disappears due to the changed token, then the testing block 708 deems the original token that was changed to be a true token (lines 7-9 in Algorithm 2 of Table 4). Traffic may disappear, for example, because some network filtering processes might block traffic if a port token is changed (e.g., ipfilters in Linux). Another possibility is that the port appears in some access control configuration file like /etc/iptables.conf. The testing block can identify whether the port token is a true token by checking the network behavior change. If the original network traffic including this port disappears, then the testing block 708 determines that this token is a true port token and records the IP address associated with this port for token dependency discovery purposes (lines 7-9 in Algorithm 2 of Table 4).

For expository purposes, an example of new traffic appearing and/or old traffic disappearing due to a token change is provided herein below. Suppose the hostname token of a machine is changed from A to B in the "/etc/hosts" file. When the process is restarted or during request execution, a new query to the DNS server will be sent to resolve the hostname A. This is because, earlier, the "/etc/hosts" file included the mapping from A to the IP address of A. After changing the hostname to B, the operating system does not find this mapping in "/etc/hosts" file and thus resorts to sending a lookup to the DNS server. Because the traffic includes the hostname A, the testing block 708 determines that A is a true network token.

Recall that iptables access control filter in Linux controls which network hosts can send traffic to the local host. If the host IP address A is changed in the iptables configuration file to B, and if A sends traffic to the local host, then iptables will drop the traffic since the IP address of B does not match the filter. For example, if A sends a TCP SYN (synchronize) packet to B, then A will not receive an ACK (acknowledgment) packet for this message. This is an example where changing the network token will cause original traffic (TCP SYN ACK to A) to disappear. Since the changed token is A and traffic sent to A from the local host disappears, the testing block 708 determines that A is a true network token.

It should be noted that if the testing block 708 deems a token to be a true token at step 908, then the testing block 708 can also deem the potential configuration file in which the token was changed at step 902 in the same iteration of the method 900 to be a true configuration file.

At step 910, the testing block 708 can determine whether all tokens determined at block 702 and all corresponding configuration files selected at block 706 have been considered. If not, then the method can proceed to step 902 and can be repeated. Otherwise, the method can proceed to step 912, at which the testing block 708 can output all of the tokens determined to be true and all of the configuration files determined to be true. Thus, in accordance with the method 900, each token determined at block 702 is evaluated. Further, the tokens can be evaluated in multiple iterations of the method 900. In particular, each token is evaluated for every configuration file determined at block 706 in which it is included. Thus, the number of iterations of the method 900 in which a given token is evaluated is the number of configuration files determined at block 706 in which the given token is included.

As indicated above, the system/method 700 can include a token dependency detection block 712. Here, the detection block 712 determines that two network tokens determined to be true are dependent if changing at least a portion of one of the tokens necessitates changing at least a portion of the other token to the identical same value for the application to work correctly. Informally, two tokens t1 and t2 are mutually dependent on each other if changing t1 necessitates changing t2 identically to the same value. For example, if the administrator changes the listening port of a JBoss application server from 8009 to 8010, it should be reflected in the configuration file /etc/httpd/conf/workers.properties of Apache httpd also to make sure the httpd server and the application server can properly communicate.

It should be noted that the detection block 712 can apply different methods to determine dependencies between true tokens based on the token types considered. For example, the discovery block determines that two IP addresses are dependent if they are identical. For example, if IP addresses of DNS servers in all service tiers are identical, then the detection block 712 determines that the addresses are dependent. For example, assume that the IP address "138.15.200.9" in the three hosts of FIG. 6 represent the IP address of the DNS server. If the IP address is updated at one host, then the address should be consistently updated at all hosts to ensure that the system 600 operates properly. Thus, these IP addresses are mutually dependent.

With regard to IP addresses and IP prefixes, the detection block 712 determines that an IP address and an IP prefix are dependent if the IP prefix is applied to the IP address during communication between two hosts. For example, "138.15.164.143" (IP of Apache server) and "138.15.164.255/24" in the iptables of JBoss (as an IP filter) are dependent, as the iptables at JBoss only permits the traffic from another host to reach the JBoss application server if the prefix of the IP address of the sending host satisfies the prefix constraint. In other words, the network messages from Apache are permitted to be processed by the JBoss server only if they pass the filter present in the iptables. It should be noted that after migration, if the IP address of the Apache httpd server changes, then the IP prefix rule in the ipfilter module should be consistently updated for the httpd server to reliably communicate with the JBoss server.

With regard to port numbers or tokens, the detection block 712 determines that two port tokens are dependent if they point to the same end host represented by the (IP, host) tuple. For example, consider the case where two Apache httpd servers are each connected to separate JBoss servers for high performance. The port number 8009 is present in both httpd servers. But if only one of the JBoss servers changes the port number to 8010, only the httpd server that communicates with that JBoss server should update the port number in /etc/httpd/conf/workers.properties file. This example suggests that a port number is usually associated with an IP address of either the local host (if port is used to listen) or the remote host (if the remote host is listening on that port). Thus, two port number tokens p1 and p2 are mutually dependent if they point to the same (IP, Port) node. The detection block 712 can use the strace and tcpdump generated trace files to build the association between a port and the IP address, as described above with respect to Algorithm 2 in Table 4. For example, the tcpdump trace file at Apache httpd shows that { . . . IP 138.15.164.143.47998>138.15.164.144.8009 . . . }, suggesting that port 8009 is associated with IP "138.15.164.144", the IP address of the JBoss server in the exemplary setup. Similarly, the strace log at the JBoss server shows that bind(152, {sa_family=AF_INET, sin_port=htons(8009), sin_addr=inet_addr("0.0.0.0")}, 16). This indicates that IP "0.0.0.0" is associated with port 8009. Because "0.0.0.0" refers to the local IP address ("138.15.164.144" in the exemplary setup), thus associating 8009 with the IP address of the JBoss server. Accordingly, the port 8009 present in /etc/httpd/conf/workers.properties at the Apache httpd server is dependent on the port number 8009 present in server.xml file present in the JBoss server.

With respect to hostnames, the detection block 712 determines that two hostnames are dependent if they point to the same end host or node described by the (domain name, hostname) tuple. This information can be obtained again in the manner described above with respect to Algorithm 2 presented in Table 4.

With regard to domain name tokens, the detection block 712 determines that two domain names are mutually dependent if they match exactly.

The previous approach described above with respect to block 704 identifies the list of configuration tokens and the files in which they are present accurately. However, the approach can incur a non-negligible interruption to the production service. In accordance with exemplary embodiments, an alternate approach that does not cause any downtime to the service but still provides meaningful results in terms of identifying network related tokens can be employed.

The alternate approach is based on important observations about how typical configuration files are updated and accessed. For example, a configuration file should be accessed or read by the associated process during or after the boot up step. Moreover, a configuration file should be read or accessed after its contents are modified to make sure the effect of new modifications can take place. Based on these observations a potential configuration discovery method can be applied.

Figure 10:
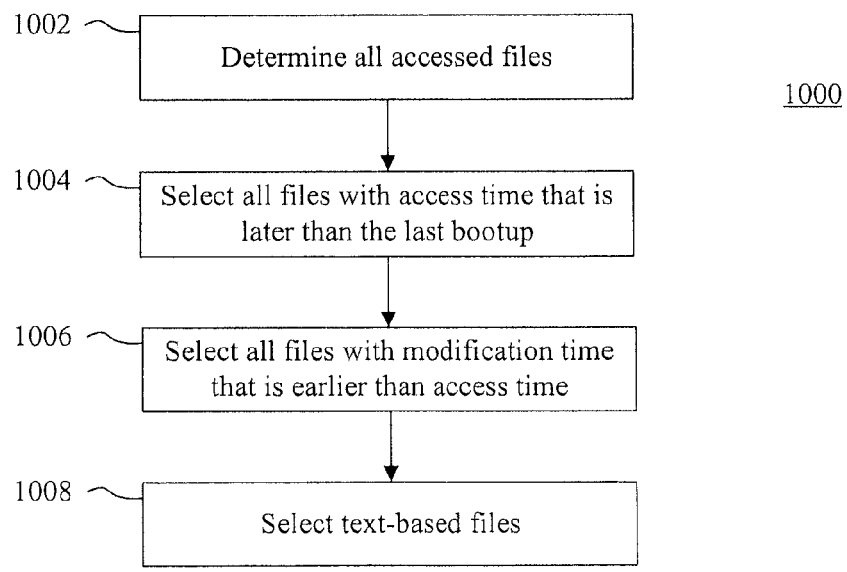
FIG. 10 is a flow diagram of an alternative embodiment of a method for determining potential configuration files in a system.

With reference now to FIG. 10 with continuing reference to FIG. 7, an exemplary method 1000 for discovering potential configuration files based on the alternate approach is illustrated. In particular, the method 1000 can be performed at or by block 704. The method 1000 can begin at step 1002, in which the discovery block 704 can determine all the files accessed since the most recent boot up. In particular, the discovery block 704 can record the most recent boot up time, the access or read times of each of the determined files after the most recent boot up, a modification time of any of the determined files that were modified since the boot up, and a change time for any of the determined files. For example, operating systems provide mechanisms to learn when a file was last accessed, when the file was last modified, and when its metadata was last updated. Examples of such mechanisms include stat command in Linux and similar commands in Windows with "cygwin" runtime.

The access time of a file is the last time this file is read (precision is in seconds). In Linux, for both ext3 and ext4 file systems, three options are present with regard to the access time: -atime, -noatime, -relatime. If the option "-atime" is used, the file access time is recorded every time the file is read. If "-noatime" is used, access time is not recorded. The default option is "-relatime," which means that when the file is read, the access time is recorded only when it was either more than 24 hours (reconfigurable) ago or it was older than the file modify or modification time. The modify or modification time of a file is the last time the content of the file is changed (precision is in seconds). This time is recorded every time the file content is changed. The change time of a file is the last time the file inode information is changed, e.g., file type, permissions, owner, group, file size, etc. Note that if the modify time is changed, the change time will also change. Similar book-keeping is present for Windows file systems, both NTFS and FAT. For expository purposes, it can be assumed that the production system uses either "-relatime" or "-atime" as the file system option. One basic approach for determining potential configuration files is to start with having all the files in the file system as candidates and select files that are likely to be configuration files based on their access patterns. Alternatively, the block 704 can gradually filter out the files that are unlikely to be configuration files based on their access patterns.

At step 1004, the discovery block 704 can select, as potential configuration files, all files with an access time that is later than the last boot up time. As noted above, the access time of a file should be later than the system boot up time. Thus, out of all files in the whole machine, the discovery block can remove from a list of potential configuration files those files whose access time was earlier than the last system boot up time. As stated above, operating systems provide standard facilities to obtain the access time of a file and the last system boot up time. For example, the starting time of the processes can be found by command "ps-eo pid,1start." Here, because the discovery block 704 is concerned with all configuration files on the system, the discovery block 704 uses the system boot-up time as a reference, as each process is started after the system boot time. If the current file system has an option of "-atime," then the discovery block 704 can just find all files whose access time are newer than the system boot-up time. If the current file system has an option of "-relatime," then the access time of the files that are read after the system boot-up cannot be older than 24 hours before system boot-up (or else the access time will be updated when the files are read because it is more than 24 hours). Therefore, to be conservative, the discovery block 704 finds all files whose access time is newer than 24 hours before the system boot-up. In both cases of "-atime" and "-relatime," the discovery block 704 can use the same commands as follows. The discovery block 704 can first find the system boot-up time using ps-eo pid,1start. Then the discovery block 704 can create a file with the access time as the system boot-up time (or 24 hours before that), using touch /tmp/sysboot-tYYYYMMDDHHMM.SS. The discovery block 704 can find all files that are accessed after that by using find/–anewer/tmp/sysboot. In this step, many files, such as source code, documentations and other text files that are never read after system boot can be filtered out.

At step 1006, the discovery block 704 can select, as potential configuration files, all files with modification times that are earlier than its access time that is later than the boot up time. For example, the discovery block can select, from the files determined at step 1004, all of the files with modification times that are earlier than its access time after the boot up time. For example, as indicated above, a typical configuration file, if modified, is read subsequent to the modification by the service to ensure that the changes or the new configuration take effect. Other files, such as the log files, will be modified and may not be read for a while. This implies that the discovery block 704 can use the file access time and file modify time to filter non-configuration files. Thus, the discovery block 704 can further remove those files whose modify time is later than their access time at step 1006. Specifically, all files whose access time is older than or equal to the modify time can be filtered out. Some log files may be filtered out, and some files whose modify time is equal to the modify time are also filtered out, such as some text data files that are edited in a "wr" mode but are never read again after closing.

At step 1008, the discovery block 704 can select text-based files as potential configuration files. For example, the discovery block 704 can select, from the files selected at step 1006, all text-based files, as potential configuration files. For example, text-based files can be obtained by using standard operating system facilities. Examples of such facilities include "file" for Unix. Thus, non-text based files can be removed from consideration. Here, the command file <filename> in Linux can be employed by the discovery block 704 to find the file type information. The text-based files will have the keywords "text" or "XML" in the return results. The discovery block 704 can filter out those files that do not have these keywords. In this step, directories, symbolic links, binary executables, binary data files, and other non-text-based files are filtered out. It should be noted that using file filename command will change the file access time, which may be used in other steps to filter out files; thus, the discovery block 704 can use stat filename to record the file access time and can use "touch-a-t time" to change it back after the file command.

As indicated above, the potential configuration files determined at block 704 can be filtered at block 706. For example, as noted above, using netstat and tcpdump, the token identifier block 702 can find all the IP, Port, host name and domain name tokens. At block 706, these tokens are searched for in the potential configuration files and any files that do not include any of these tokens are filtered out. To reduce the overhead of tcpdump, it can be used only to monitor UDP (user datagram protocol) traffic, as TCP (transmission control protocol) traffic, either connected or listening on a port, can be obtained by netstat.

Turning now to block 710, as noted above, a heuristic procedure can be employed here to rank the files determined at block 706 and the tokens determined at block 702. Three heuristics are described herein below. In accordance with an exemplary embodiment in which a strict approach is applied, only tokens and configuration files that meet thresholds of all three of the heuristics are deemed at block 710 as being true tokens and configuration files, respectively. In accordance with an exemplary embodiment in which a relaxed approach is applied, only tokens and configuration files that meet thresholds of one or two of the three of the heuristics are deemed at block 710 as being true tokens and configuration files, respectively. In one embodiment, all three heuristics can be applied to determine a comprehensive rank of a configuration file or token. In accordance with this embodiment, the default base weight of a file that includes any token, other than a port token, determined at block 702 is 0. The base weight of a file including a port token is 1. In the case of conflicts where a file includes more than one type of token, the token rendering the lowest weight is selected as the weight of the file. The weights can increase or decrease based on the heuristics described herein below, thus changing the rank of the files accordingly. In one implementation of this embodiment, the testing block 710 determines that files that have a weight lower than or equal to 0.25 are true configuration files and determines that files that have a weight greater than or equal to 0.25 are not true configuration files. This threshold can also be applied in exemplary embodiments in which only one or two of the heuristics are employed.

The first heuristic can be used to rank port number type tokens and files that include such tokens. For example, port tokens have high false positives because they can match an integer value in a large number of files. In particular, the first heuristic can be employed to rank port tokens and all the files that include the port tokens based on how "close" a file including a port token is to a file that includes an IP address type or hostname type token. This is based on the intuition that configuration files for an application or service are usually in the same directory or adjacent directories in the file system hierarchy. Informally, two files are deemed at block 710 to be close if their pathnames have a significant matching prefix; in other words, the closeness of files increases as the prefix match increases.

Figure 11:
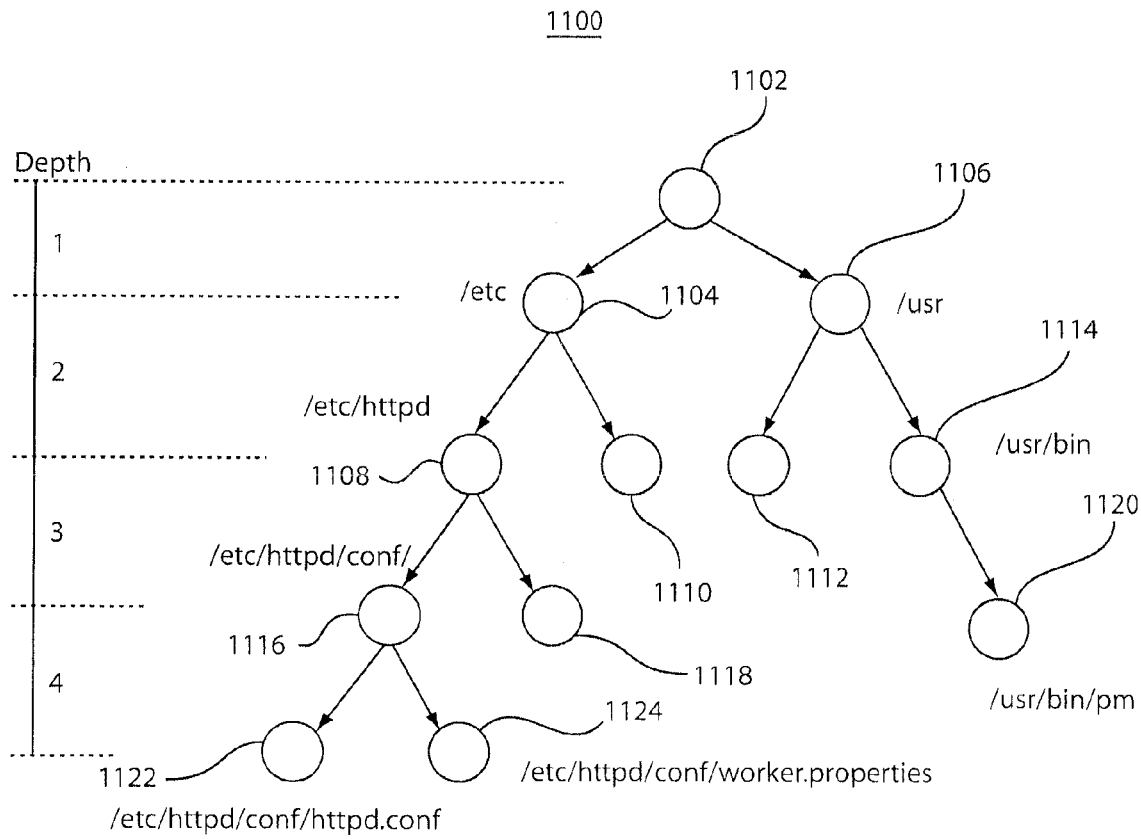
FIG. 11 is a diagram of a tree structure that can be employed in determining the likelihood that potential configuration files and tokens are true configuration files and tokens.

The relevant file system is modeled here as a directory tree, with the root directly as tree root, each file as a leaf node and each directory/file as a node. The path name of a file identifies the path taken in the tree from the root to reach that file. FIG. 11 provides an example of a directory tree 1100, which includes nodes 1102-1124. As illustrated in the tree 1100, nodes 1104-1106 have a depth of one, nodes 1108-1114 have a depth of two, nodes 1116-1120 have a depth of three and nodes 1122-1124 have a depth of four. In accordance with the first heuristic, the testing block 710 can assign a non-negative floating number weight to each edge based on their depth in the directory tree. An edge connecting a node at depth n with another node at depth (n−1) has a weight of $2^{-n}$. The "distance" between two files is then the sum of the weights of the edges in the path between the two nodes.

It should be noted that two files are considered close (have a smaller distance) if they have a common parent that is deep in the file system hierarchy, and their closeness increases as their depth in the directory tree increases. For example, nodes 1122 and 1124 have a distance of 0.125 while nodes 1122 and 1120 have a distance of 1.8125. These distances capture the closeness of the set of files represented by nodes 1122, 1124 and 1120: nodes 1122 and 1124 are close while nodes 1124 and 1120 are far away. If the node 1124 includes an IP address or hostname and the nodes 1122 and 1120 each include a port token, then this heuristic estimates that node 1122 is more likely to have a true port token than node 1120.

Thus, for each file that has a port token, the testing block 710 finds the file's distance to all files that have an IP address or hostname token and uses the minimum value as its weight (if lower than its base weight, described above). Next, the testing block 710 ranks the potential configuration files based on their increasing weight. Files with higher rank are considered more likely to be true configuration files. Thereafter, the testing block 710 can rank the files that include the port numbers based on the increasing weights, where the smallest weight has the highest rank and the largest weight has the lowest rank. Further, any port number that is included in one of the potential files can be assigned the same rank as the file in which it is included. If the port number is included in multiple files, then the port number is assigned with the rank of the file having the highest rank among the multiple files.

As described in more detail herein below, a penalty can be applied to any file, and possibly a corresponding token included therein, that includes the same token multiple times, as these are unlikely to be configuration files. The penalty increases the weight of the file, thus dropping its rank.

With regard to the second heuristic, it should be noted that from block 706, a list of all files that have possible configuration tokens including IP addresses, hostnames, domain names, and port numbers are obtained. For the files that have IP addresses and hostnames, the files in which one specific IP address or hostname appears many times, for example more than ten times, are less likely to be true configuration files. This is reasonable since it is not expected for a human generated or edited configuration file to have a large number of identical IP/hostnames at multiple locations, as changing that value necessitates editing at multiple locations and it is easy for a user to make a mistake in not consistently updating at all locations. Such files are usually log files or history files (e.g., .bash_history in each user's home directory for a user in Unix). Here, in accordance with one aspect, the testing block 710 can examine each of the files obtained from block 706. For any file in which a given IP address or a given hostname appears more than ten times, the testing block 710 determines that this file is not a true configuration file. In accordance with another more comprehensive aspect, the testing block 710 can apply a penalty to a rank of a given configuration file for every occurrence of a given token in the given configuration file. For example, after examining each of the files obtained from block 706, the testing block 710 can count the occurrences of a token value in a file and assigns (adds) a penalty of 0.1 to the file for each occurrence of a given IP address and for each occurrence of a given hostname address. Thus, as the number of such tokens increase in a file, the rank of the file is reduced in the final ranking. It should be noted that, with regard to IP addresses, hostnames and domain names, any given IP address, hostname or domain name token can be assigned the rank of a file that has the highest rank among files that include the given IP address, the given hostname or the given domain name, respectively. Indeed, in accordance with one exemplary aspect. It should be noted that, with regard to IP addresses, hostnames and domain names, any given token can be assigned the rank of a file that has the highest rank among files that include the given token.

The third heuristic that can be applied at the testing block 710 utilizes the context information of a token to upgrade the rank of a token or configuration file. For example, if a process with the name "httpd" uses port 80, then, among all files that include a token 80, it is more likely that a true token file includes the process name (httpd in the example) either in the path name of the file or its contents. Specifically, in response to determining that a process name of a process that uses a token included in a potential file exists in the content of that file, then the testing block 710 can decrease its weight by half. Further, in response to determining that the process name of a process that uses a token included in a potential file exists in the pathname of the file, the learning block 710 can reduce the weight by half. Moreover, if such a process name exists in both the content of the potential file and the path name of the potential file, then the learning block 710 can reduce the weight by ¼.

Having described preferred embodiments of systems and methods (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for determining whether a networked system migration is successful, comprising:
   determining a first set of properties of the networked system on a source platform in a first administrative domain;
   transferring the networked system to a destination platform in a second administrative domain such that at least a portion of the networked system is transferred to at least one storage medium on the destination platform;
   determining a second set of properties of the transferred system on the destination platform, wherein the first and second sets of properties include functional properties and at least one of: performance properties, security properties or reliability properties; and
   outputting an indication that the transfer of the system to the destination platform is successful in response to determining that the functional properties of the second set are equivalent to the functional properties of the first set and that at least one of the performance properties, the security properties or the reliability properties of the second set are equivalent to at least one of the corresponding performance properties, the security properties or the reliability properties of the first set of properties;
   wherein the determination of the first set of properties includes injecting failures into the networked system;
   representing a network message trace as a network graph with a relative edge count difference M $$M_C = \sum \frac{|C_1^k - C_2^k|}{C_1^k + C_2^k}$$

where C is a difference of total messages k sent on each edge between two graphs;
   wherein the determination of the first set of properties includes a shutdown of services.

2. The method of claim 1, further comprising:
   comparing a first given property in the first set to a second given property in the second set by selecting a comparator function from a plurality of comparator functions based on the first and second given properties and by applying the selected comparator function to the first and second given properties.

3. The method of claim 2, wherein the selected comparator function is a strict comparator function in that the first and second given properties are determined to be equivalent if the first and second given properties exactly match.

4. The method of claim 2, wherein the selected comparator function is an approximate numerical comparator function in that the first and second given properties are determined to be equivalent if the second given property is within a pre-determined error threshold of the first given property.

5. The method of claim 2, wherein the selected comparator function is an approximate structural comparator function in that: a) the first and second given properties are evaluated by constructing a first graph-based structure that models the first given property and constructing a second graph-based structure that models the second given property and b) the first and second given properties are determined to be equivalent if at least one metric that is based on edges of the second graph-based structure is within a corresponding error threshold of at least one metric that is based on edges of the first graph-based structure.

6. The method of claim 5, wherein the determining the first set of properties comprises determining the threshold by generating a plurality of initial graph-based structures that model the first given property and that are based on initial conditions on which the first graph based structure is based.

7. The method of claim 6, wherein the determining the first set of properties comprises determining the threshold by selecting the threshold based on differences between the initial graph-based structures.

8. A migration system for determining whether a networked system migration is successful comprising:
   a first learning module configured to determine a first set of properties of the networked system on a source platform in a first administrative domain;
   second administrative domain such that at least a portion of the networked system is transferred to at least one storage medium on the destination platform;
   a second learning module configured to determine a second set of properties of the transferred system on the destination platform, wherein the first and second sets of properties include functional properties and at least one of: performance properties, security properties or reliability properties; and
   a comparator configured to output an indication that the transfer of the networked system to the destination platform is successful in response to determining that the functional properties of the second set are equivalent to the functional properties of the first set and that at least one of the performance properties, the security properties or the reliability properties of the second set are equivalent to at least one of the corresponding performance properties, the security properties or the reliability properties of the first set of properties;
   determining a relative edge count difference $$M_C = \sum \frac{|C_1^k - C_2^k|}{C_1^k + C_2^k}$$

where C is a difference of total messages k sent on each edge between two graphs 1 and 2;

wherein the determination of the first set of properties includes injecting failures into the networked system;

wherein the determination of the first set of properties includes a shutdown of services.

9. The migration system of claim 8, wherein the comparator is further configured to compare a first given property in the first set to a second given property in the second set by selecting a comparator function from a plurality of comparator functions based on the first and second given properties and by applying the selected comparator function to the first and second given properties.

10. The migration system of claim 9, wherein the selected comparator function is a strict comparator function in that the first and second given properties are determined to be equivalent if the first and second given properties exactly match.

11. The migration system of claim 9, wherein the selected comparator function is an approximate numerical comparator function in that the first and second given properties are determined to be equivalent if the second given property is within a predetermined error threshold of the first given property.

12. The migration system of claim 9, wherein the selected comparator function is an approximate structural comparator function in that: a) the first and second given properties are evaluated by constructing a first graph-based structure that models the first given property and by constructing a second graph-based structure that models the second given property, and b) the first and second given properties are determined to be equivalent if at least one metric that is based on edges of the second graph-based structure is within a corresponding error threshold of at least one metric that is based on edges of the first graph-based structure.

13. The migration system of claim 12, wherein the first learning module is further configured to determine the threshold by generating a plurality of initial graph-based structures that model the first given property and that are based on initial conditions on which the first graph-based structure is based.

14. The migration system of claim 13, wherein the first learning module is further configured to determine the threshold by selecting the threshold based on differences between the initial graph-based structures.

15. The migration system of claim 8, wherein the first learning module, the transfer module and the comparator are further configured to reference and update corresponding databases that include information detailing tests, transfer procedures and comparator functions employed during past migrations.

* * * * *